US010320942B2

United States Patent
Chiussi et al.

(10) Patent No.: US 10,320,942 B2
(45) Date of Patent: Jun. 11, 2019

(54) DYNAMIC USER INTERFACE DELIVERY SYSTEM

(71) Applicant: GADGET SOFTWARE, INC., Newark, NJ (US)

(72) Inventors: Fabio M. Chiussi, Long Branch, NJ (US); Parameshwar Hegde, Westford, MA (US)

(73) Assignee: GADGET SOFTWARE, INC., Newark, NJ (US)

( * ) Notice: Subject to any disclaimer, the term of this patent is extended or adjusted under 35 U.S.C. 154(b) by 568 days.

(21) Appl. No.: 13/833,775

(22) Filed: Mar. 15, 2013

(65) Prior Publication Data

US 2014/0280477 A1 Sep. 18, 2014

(51) Int. Cl.
*H04L 29/08* (2006.01)
*H04W 4/50* (2018.01)
*H04W 4/60* (2018.01)
*H04W 4/00* (2018.01)

(52) U.S. Cl.
CPC ............. *H04L 67/34* (2013.01); *H04W 4/001* (2013.01); *H04W 4/003* (2013.01); *H04W 4/50* (2018.02); *H04W 4/60* (2018.02)

(58) Field of Classification Search
CPC ..... G06F 8/00; G06F 8/10; G06F 8/20; G06F 8/30; G06F 8/40; G06F 8/60; G06F 8/70
See application file for complete search history.

(56) References Cited

U.S. PATENT DOCUMENTS

| 6,542,908 B1* | 4/2003 | Ims |
| 6,804,718 B1 | 10/2004 | Pang et al. |
| 7,461,086 B1 | 12/2008 | Hurren et al. |
| 7,676,552 B2* | 3/2010 | Eilam .................. G06F 9/5061 |
| | | 379/242 |
| 7,984,060 B2 | 7/2011 | Payton et al. |
| 8,170,536 B2 | 5/2012 | Normark et al. |
| 2002/0033843 A1 | 3/2002 | Loos et al. |
| 2002/0078253 A1 | 6/2002 | Szondy et al. |

(Continued)

OTHER PUBLICATIONS

ISR written opinion of the International searching authority for the corresponding PCT application 2014026995.

*Primary Examiner* — Tonia L Dollinger
*Assistant Examiner* — Albert Chiou
(74) *Attorney, Agent, or Firm* — Miles & Stockbridge P.C.

(57) ABSTRACT

A System Solution offers a Business Entity a way to update a Native Application Client by directly downloading a new version of the Application Client from an Application Server bypassing the Application Store. A Native Application Client is updated while the current Native Application Client is running on the Client Device. A Native Application Client is divided into a Native Layer which runs directly on the Operating System of the Client Device and a Dynamic Layer that runs on the Native Layer. The System Solution automatically generates Application Clients, Application Servers, and Dashboards. The Business Entity uses the generated Dashboards to modify the Dynamic Layer by generating a new Dynamic Layer and making it available for download to the Client Device. The Navigation Parameters can be set in the Dynamic Layer allowing the Business Entity to change the application flow of the Native Application Client.

17 Claims, 21 Drawing Sheets

(56) References Cited

U.S. PATENT DOCUMENTS

| | | |
|---|---|---|
| 2003/0208640 A1* | 11/2003 | Just .......................... G06F 8/30 |
| | | 719/330 |
| 2006/0026335 A1 | 2/2006 | Hodgson et al. |
| 2006/0236302 A1 | 10/2006 | Bateman et al. |
| 2007/0150816 A1 | 6/2007 | Hariki |
| 2007/0157191 A1 | 7/2007 | Seeger et al. |
| 2009/0006409 A1 | 1/2009 | Yang et al. |
| 2009/0063421 A1 | 3/2009 | Burson et al. |
| 2009/0183092 A1 | 7/2009 | Naghshineh |
| 2010/0005481 A1 | 1/2010 | Lewis et al. |
| 2010/0070496 A1 | 3/2010 | Ghosh |
| 2010/0124939 A1 | 5/2010 | Osborne et al. |
| 2011/0016448 A1 | 1/2011 | Bauder et al. |
| 2011/0137935 A1 | 6/2011 | Bobick et al. |
| 2011/0154287 A1 | 6/2011 | Mukkamala et al. |
| 2011/0161912 A1* | 6/2011 | Eteminan et al. ............ 717/101 |
| 2011/0164056 A1 | 7/2011 | Ording et al. |
| 2011/0276608 A1 | 11/2011 | O'Farrell et al. |
| 2012/0109951 A1 | 5/2012 | Huynh et al. |
| 2012/0174079 A1 | 7/2012 | Luh |
| 2012/0213103 A1 | 8/2012 | Du et al. |
| 2012/0226676 A1 | 9/2012 | Kasterstein et al. |
| 2012/0260232 A1* | 10/2012 | Hirsch et al. ................ 717/107 |
| 2012/0278704 A1 | 11/2012 | Ying et al. |
| 2012/0323965 A1 | 12/2012 | Carpenter et al. |
| 2013/0013671 A1 | 1/2013 | Relan et al. |

\* cited by examiner

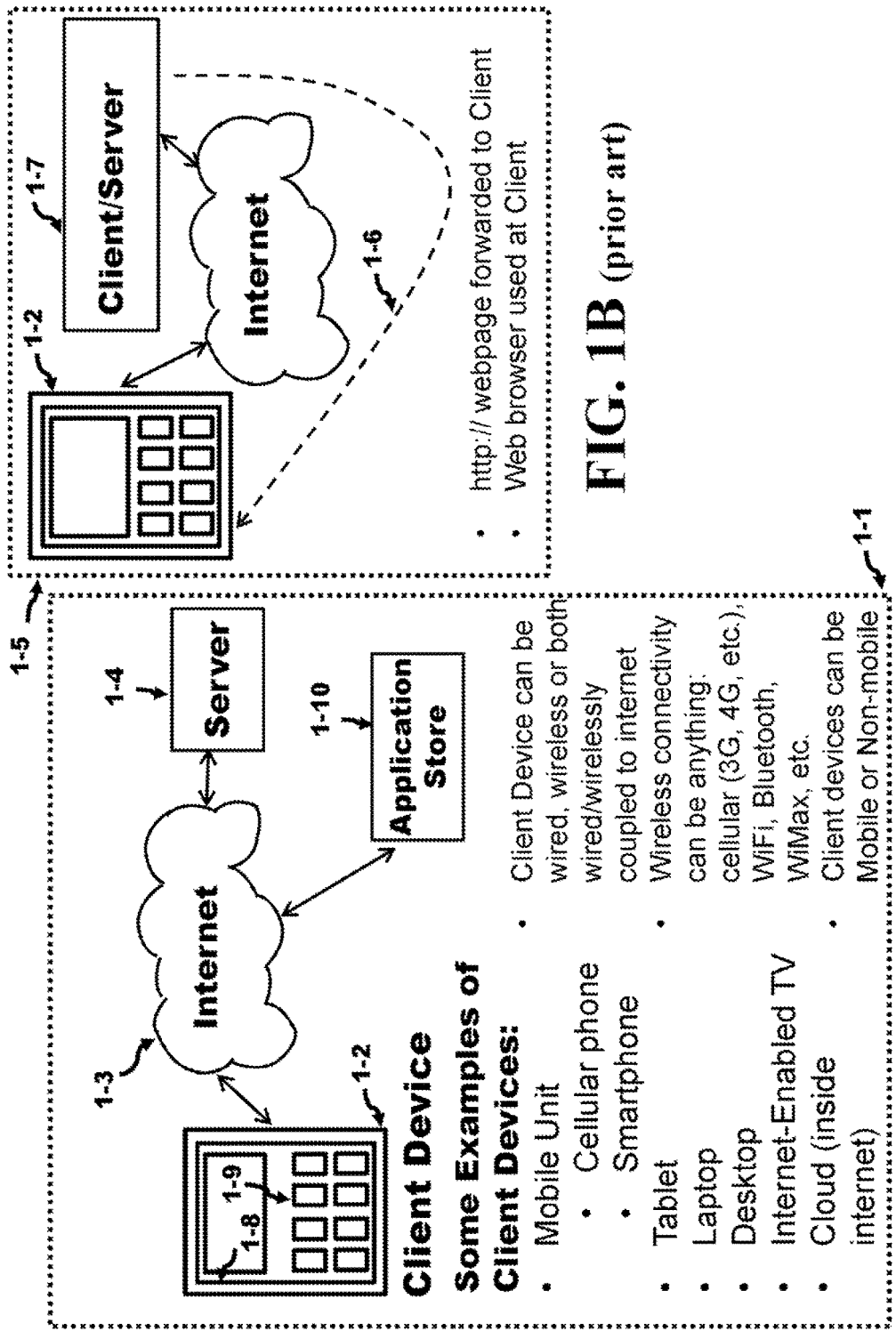

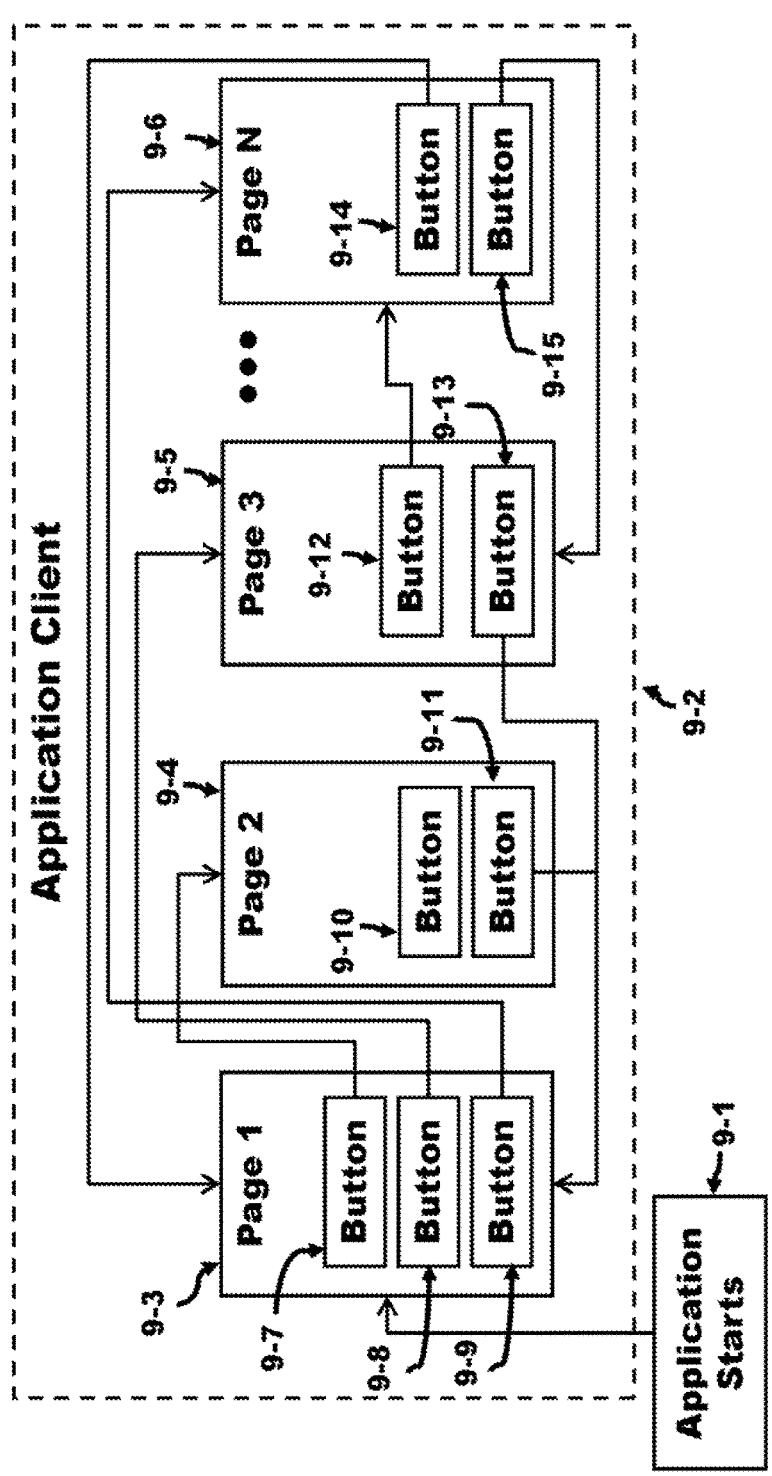
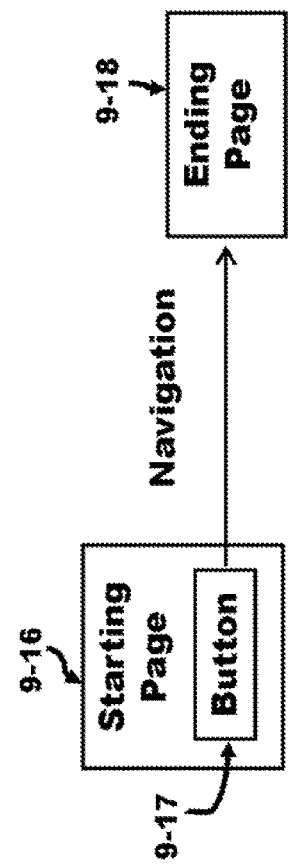
FIG. 9A
FIG. 9B

DYNAMIC USER INTERFACE DELIVERY SYSTEM

CROSS-REFERENCE TO RELATED APPLICATIONS

The present application is related to the co-filed U.S. application Ser. No. 13/833,589 entitled "Apparatus for Single Workflow for Multi-Platform Mobile Application Creation and Delivery", Ser. No. 13/833,669 entitled "Method for Single Workflow for Multi-Platform Mobile Application Creation and Delivery", Ser. No. 13/833,849 entitled "User Interface and Content Translation System", and Ser. No. 13/834,765 entitled "Hierarchical Application Client System", filed on Mar. 15, 2013, which are assigned to the same assignee as the present application and invented by the same inventors as the present application and incorporated herein by reference in its entirety.

BACKGROUND OF THE INVENTION

The internet is a communication system that interconnects the world. The internet has been structured to provide connectivity to billions of users with laptops, notebooks, desktops, Internet Enabled TV sets, cellular phones, smartphones like the iPhone™, Android™ and Blackberry™, wearable devices, and tablets. The internet 1-3 connects a Client Device 1-2 to a server 1-4 and the server to the same Client Device as illustrated in 1-1 of FIG. 1A or to another Client Device (not illustrated). The Client Device 1-2 can have at least one display screen 1-8 that can be a touch sensitive screen, pen based or both. The screen can display various icons or be attached to a physical keypad 1-9. As illustrated in 1-1, the Client Devices are physical and can be either mobile, such as cellular phones, smartphones, wearable devices, and tablets, or non-mobile, such as laptops, desktops, and TV sets, The Client Devices 1-2 are coupled to the internet by wired (a physical interconnect), wirelessly (waves through space), or both wired/wireless networks. The wireless connectivity can be cellular (3G, 4G, etc.), Wi-Fi, Bluetooth, WiMax, etc. The Client Device 1-2 runs the Application Client which is the actual application software running on device.

FIG. 1A also shows an Application Store 1-10 connected to the internet. The Application Store 1-10 makes application clients available for download to the Client Devices. There is a plurality of Application Stores, each of the Application Stores dedicated to make available for download Application Clients for a certain type of Client Device or Client Device Operating System. For example, the Apple™ Application Store makes Application Clients for the iPhone™ and iPad™ available for download, the Android™ Application Store makes Application Clients for smartphones and tablets running the Android™ Operating System available for download, etc. There are Application Stores dedicated to support mobile Client Devices (for example, the iPhone™/iPad™ Apple™ Application Store, the Blackberry™ Application Store, etc.), and Application Stores dedicated to support non-mobile Client Devices (for example, the Mac™ Apple™ Application Store, which makes applications for Apple™ computers running the Mac™ Operating System available for download).

The Cloud uses the network of the Internet to offer services to users by using a combination of hardware and software embedded in the network. An Application Client can be in the Cloud, but in this case the Client Device is a "virtual" Client Device. The "virtual" Client Device has a way to provide access to the Application Client running in the cloud via a physical Client Device. For example, as in the example listed in 1-5 of FIG. 1B, a web browser 1-6 running on the physical Client Device 1-2 and coupled to the client/server 1-7 in the Cloud via the Internet accesses the Application Client running in the Cloud, which performs the actual application software. For the Cloud, there are two cases: the entire Application Client runs in the Cloud, or a small portion of the Application Client runs on a physical Client Device while most of the logic runs in the Cloud.

FIG. 2A illustrates a system 2-1 with the hardware 2-16 and software 2-15 of a Client Device 1-2. The Client Device 1-2 is coupled to the Internet 1-3 via wireline connection or Radio Frequency (RF) wireless transmission network (wired/wireless) 2-2 and further coupled to a bank of servers 2-4 via a second interconnection 2-3 that can be wired or wireless. The communication link is a receiver and a transmitter known as a transceiver and is coupled to either a wired connector or an antenna (not illustrated) for the wireline connection or RF wireless transmission network, respectively. In general, these links: wired, wireless, cellular, internet, etc. are called the Communication network. The Communication network couples all components together. The server's bank 2-4 comprises server-0 2-11 to server-N 2-12. The bank contains at least one server and these servers can be localized, coupled by an Intranet, or be physically separated from one another, coupled by the Internet. The Operating System (OS) 2-13 running in the Client Device is closely coupled with the hardware 2-16, especially in case of Mobile Client Devices 1-2. The hardware 2-16 comprises at least one processor 2-5 operating under the Operating System 2-13. The processor 2-5 is coupled to at least one memory 2-7 and at least one communication link 2-9 via at least one bus 2-8. At least one communication link 2-9 couples the Client Device to the outside world through a wired and/or wireless interconnection via the transceiver. The Client Device offers the user at least one mode of input and one mode of output. One mode of input to the Client Device 1-2 is via the touch based keypad 2-6 or through voice control (not illustrated). The screen 2-10 can be a touch sensitive screen and provide a second mode of input. The screen 2-10 can provide an output response or sound can provide a second mode of output known as voice output (not illustrated). Other hardware components such as MEMS, power supplies, etc. are not mentioned but are well-known by those skilled in the art. A set of applications or Application Clients 2-14 run on the Client Device are coupled to the Operating System 2-13. The Client Device is one of a plurality of Client Devices coupled to the Internet 1-3. An Application Store 1-10 connected 2-21 to the Internet FIG. 2B illustrates that when the term server 2-20 is used, this server is a sub-set representation of a Computer hardware 2-17, which can contain software 2-18, a database 2-19 and the server 2-20 itself. Other components not illustrated are the memory, power supply, etc. One skilled in the art is knowledgeable of other components contained in this device and will not be described further. All servers used in this specification are substantially the same as the server 2-20. Furthermore, a plurality of servers and a plurality of databases can be embedded in the Computer hardware 2-17.

The term "Client Device" encompasses the device being Mobile, Non-Mobile, or located in the Cloud. However, in some cases, for further distinction within this document the term "Mobile Client Device" will be used for mobile devices, "Non-Mobile Client Device" will be used for non-mobile devices and "Cloud Client Device" will be used for the device formed in the Cloud.

FIG. 3A and FIG. 3B present two different types of Application Clients. This distinction is especially relevant in the case of mobile Client Devices, but is also applicable to non-mobile Client Devices. FIG. 3A shows a Native Application Client 3-1 and how it relates to the layered stacks of the hardware/software representation of a Client Device 1-2. The Native Application Client 3-1 is an executable which runs directly on the Operating System 2-13 of the Client Device 1-2, which in turn runs on the hardware 2-16 of the Client Device 1-2. The Operating System 2-13 provides a set of system libraries 3-5, which the Native Application Client uses 3-2. The Native Application Client 3-1 is compiled to run on the Operating System of the Client Device. The Native Application Client needs to be downloaded to the Client Device and installed on the Client Device in order to run on the Client Device.

FIG. 3B shows a Non-Native Application Client 3-1b and how it relates to the layered stacks of the hardware/software representation of a Client Device 1-2a. The Non-Native Application Client 3-1h does not run directly on the Operating System 2-13h of the Client Device, but instead uses a web browser 3-3 installed on the Client Device in order to run. The Non-Native Application Client 3-1h is written in a programming language that is understood by the web browser running on the Client Device. The most common example of such a language is HTML5. The web browser running on the Client Device contains a HTML5 parser 3-4 that is used to interpret the code of the Non-Native Application Client 3-1h. The Non-Native Application Client 3-1h does not depend on the Client Device 1-2a since it does not run directly on the Operating System 2-13h but instead uses the web browser 3-3 running on the Client Device 1-2*. The Non-Native Application Client 3-1h can run on any Client Device 1-2a that runs a web browser 3-3 capable of understanding the language which the Non-Native Application Client is written in. The web browser 3-3 may depend on the Client Device 1-2a, but the Non-Native Application client does not depend on the Client Device. The Operating System 2-13h runs on the hardware 2-16h.

An approval and download process in the Application Store is illustrated in FIG. 4A. A Business Entity 4-1 creates a new application which comprises a new Native Application Client 3-1. The new Native Application Client 3-1 is submitted 4-3 to the Application Store 1-10 for an approval process 4-4. Once the new Native Application Client is accepted 4-5, information is passed to the Application Store 1-10 to make the new Native Application Client available for download and installation 4-6 into a Client Device 1-2. A Client Device 1-2 which desires the Native Application Client 3-1 downloads the Native Application Client from the corresponding Application Store 1-10. For example, an iPhone™ downloads its desired Native Application Client from the Apple™ Application Store, an Android™ device downloads its desired Native Application Client from the Android™ Application Store, etc. Once the Native Application Client is downloaded to the Client Device, it is installed on the Client Device so it can run on the Operating System of the Client Device. The client now contains a "native" application coupled to the Operating System 2-13 (see FIG. 2A and FIG. 3A) of the Client Device. The Native Mobile Application Client executable depends on the Operating System (OS) as an iPhone would require a different executable than an Android™ phone.

If the Business Entity 4-1 makes a change to the Native Application Client 3-1 as illustrated in FIG. 4B, the Updated Native Application Client 4-7 must be re-submitted 4-8 to the Application Store approval process 4-4 and re-accepted 4-9 in order for the updated Native Application Client to be made available in the Application Store 1-10 for download and installation 4-10. A Client Device 1-2 which desires the updated Native Application Client 4-7 must download 4-10 the updated Native Application Client again from the Application Store 1-10 and re-install the Native Application Client on the Client Device 1-2. The process of updating an existing Native Application Client takes considerable time and effort. The Business Entity 4-1 must re-submit the Native Application Client to the Application Store, which requires considerable time and effort since the submission procedure is typically laborious and time-consuming. The Application Store must expend funds to re-approve the new executable and the approval process may take considerable time. Once accepted, the store must distribute the new Native Application Client to the Client Device. A Client Device 1-2 which desires the updated Native Application Client must go back to the Application Store 1-10 and download the updated version of the Native Application Client and re-install it on the Client Device 1-2. The existing Native Application Client 4-2, if running on the Client Device 1-2, must be stopped and deleted from the memory of the Client Device 1-2 in order for the updated Native Application Client 4-7 to be installed on the Client Device 1-2. An existing Native Application Client 4-2 cannot be updated while it is running on the Client Device 1-2. An existing Native Application Client 4-2 cannot manage the update process, but must rely on an update manager or an external installation manager software or update manager software running on the Operating System of the Client Device to delete the existing Native Application Client, download and re-install the updated Native Application Client 4-7, and complete the update process.

BRIEF SUMMARY OF THE INVENTION

It is a first objective of the invention to provide a System Solution to update a Native Application Client that offers the Business Entity means to update a Native Application Client by directly downloading a new version of the Application Client from an Application Server that is part of the System Solution. Using these inventive ideas, the Business Entity updates the Native Application Client without resubmitting the new version of the Application Client to the Application Store.

It is a second objective of the invention to provide a System Solution to update a Native Application Client "on the fly" while the Native Application Client is running on the Client Device. Using these inventive ideas, the Native Application Client is updated without the need of stopping the existing version of the Native Application Client and reinstalling the updated version of the Native Application Client.

It is a third objective of the invention to provide a System Solution to automatically generate the Native Application Client that is updated directly from an Application Server. The Updated Native Application Client is downloaded and installed while the existing Application Client is running on the Client Device.

It is a fourth objective of the invention to automatically generate, together with the Native Application Client, the Application Server from which the updated Native Application Client is directly download and a set of Dashboards for the Business Entity to generate the updated Native Application Client. The System Solution offers the ownership, control and beneficial use of these inventive ideas.

It is a fifth objective of the invention to download only the Surfaces that have been updated. This minimizes bandwidth usage and maximizes throughput in the Communication network since only a sub-set of the Surface needs to be transferred over the communication network. This speeds the transfer time and minimizes power usage.

A preferred embodiment of the invention is a method to divide a Native Application Client in two layers, a Native Layer which runs directly on the Operating System of the Client Device and a Dynamic Layer that runs on the Native Layer. The functionality provided by the two layers constitutes the functionality of the Native Application Client. We use the term "Two-Layer Native Application Client" or the term "Dynamic Native Application Client" to refer to the Native Application Client.

In this embodiment of the invention, the Native Layer is downloaded from the Application Store. When the Native Layer is modified, a new version of the Native Layer is downloaded from the Application Store and installed on the Client Device. If the existing Native Layer is running on the Client Device, it needs first to be stopped, in order for the new version of the Native Layer to be reinstalled. If the Business Entity desires to modify the existing Native Layer, it needs to submit a new version of the existing Native Layer for approval to the Application Store.

In this embodiment of the invention, the Dynamic Layer can be downloaded from the Application Store, but it can also be downloaded directly from an Application Server that is part of the System Solution. The Dynamic Layer can be downloaded directly from an Application Server that is part of the System Solution while the Native Application Client is running on the Client Device. If the Business Entity desires to modify the existing Dynamic Layer, it can generate a new version of the Dynamic Layer and make it available for download to the Client Device while the Native Application Client is running on the Client Device. The Business Entity does not need to submit the updated Dynamic Layer to the Application Store to make it available for download to the Client Device. By modifying the Dynamic Layer, the Business Entity modifies the functionality and user experience offered by the Native Application Client to the end user.

Another embodiment of the invention is a method to divide the Native Application Client in a plurality of Pages, and dividing each of the Pages into a Page Surface and a Page Foundation, and grouping all the Page Surfaces to constitute the Dynamic Layer and all Page Foundations to constitute the Native Layer of the Native Application Client.

According to this embodiment of the invention, each Page comprises a plurality of Elements, Navigation Elements, Navigation Rules, Actionable Elements, Fillable Elements, and Native Logic, each Element further comprising a plurality of Sub-Elements and the Native Logic further comprising Orchestration, Native Client Functional Blocks, and an Update Manager. Each the Element and each the Sub-Element is associated with a Dynamic Property. The Dynamic Property has one of two values: static and dynamic. By setting the dynamic property of each Element or Sub-Element equal to "dynamic", the Element or Sub-Element is made part of the corresponding Page Surface. By setting the dynamic property of each Element or Sub-Element equal to "static", the Element or Sub-Element is made part of the corresponding Page Foundation. The Native Logic is part of the Page Foundation.

According to this embodiment of the invention, the Navigation Rules consist of Navigation Conditions which are part of the Page Foundation and Navigation Parameters which are part of the Page Surface. By setting different values of the Navigation Parameters in the Dynamic Layer of the Native Application Client, the Business Entity can change the application flow of the Native Application Client while the Native Application Client is running on the Client Device.

Another embodiment of the invention includes the Native Application Client consisting of a Dynamic Layer and a Native Layer. The Native Application Client, while running on the Client Device, requests and downloads an updated Dynamic Layer from an Application Server part of the System Solution, using an Update Manager contained in the Native Layer and a Dynamic Update Protocol.

In accordance with this embodiment of the invention, the Native Application Client, while running on the Client Device, requests and downloads from an Application Server which is part of the System Solution only the Page Surfaces that are part of the updated Dynamic Layer that are desired by the End User.

Another embodiment of the preferred invention includes the apparatus comprising Computing devices with dedicated servers running the System Solution that, based on the a Service Representation selected by the Business Entity and a Business Entity Data, runs an Automatic Data Model Generator. This Automatic data Model Generator places the widely varying and random data positioning from any Business Entity into a well-defined Data Model which acts as an interface between the Automatic Data Model Generator and an Automatic Application Generator. The Automatic Application Generator uses the data from the data model to automatically generate an Application comprising a plurality of Application Components, including an Application Server, a set of Two-Layer Native Mobile Application Clients, a set of Two-Layer Non-Native Non-Mobile Application Clients, Non Native Mobile Application Clients. Client server protocol, dashboards and other components. All these Application Components implement the desired functionality of the Application for the Business Entity. The Dynamic Layer of the Native Mobile Application Clients in the set of generated Two-Layer Native Mobile Application Clients can be downloaded to the Client Devices using the generated Application Server and the generated Client server protocol. The Dynamic Layer of the Native Non-Mobile Application Clients in the set of generated Two-Layer Native Non-Mobile Application Clients can be downloaded to the Client Devices using the generated Application Server and the generated Client server protocol. The generated Dashboards can be used by the Business Entity to modify the Dynamic Layer of the Two-Layer Native Mobile Application Clients and the Two-Layer Native Non-Mobile Application Clients, and to modify the Non-Native Application Clients.

In this embodiment of the invention, the generated Dashboards are automatically generated using the Page Surfaces as inputs.

In this embodiment of the invention, the System Solution also generates a set of validation and consistency rules that are used to validate the correctness of the generated Application Components.

In accordance with another preferred embodiment of the invention, a System Apparatus comprising a System Solution with at least one first server coupled to at least one Computing device, a plurality of Client Devices where each Client Device is running an Operating System, a Communication network that couples the plurality of Client Devices and the at least one first server together, a System Libraries provided by the Operating System, a Two-Layer Native Application Client with a Native Layer and a Dynamic Layer, the Native Layer runs on the Operating System using the System Libraries, and the Dynamic Layer only uses functionality and a set of libraries provided by the Native Layer. The System Apparatus further comprising an Application Store approves the Two-Layer Native Application Client, and an approved Two-Layer Native Application Client is downloaded to the plurality of Client Devices, and further comprising a Business Entity develops a new functionality for the approved Two-Layer Native Application Client coupled to the plurality of Client Devices with an Updated Dynamic Layer, and the System Apparatus further comprising a System Solution or the Business Entity stores the Updated Dynamic Layer on an Application Server, and the System Apparatus further comprising an Update Manager in the Native Layer of the plurality of Client Devices insures that the Updated Dynamic Layer is downloaded to the plurality of Client Devices from the Application Server bypassing an approval process of the Application Store, and wherein the Updated Dynamic Layer updates the existing Dynamic Layer in the Two-Layer Native Application Client while the Two-Layer Native Application Client is running on the plurality of Client Devices. The System Apparatus further comprising the approved Two-Layer Native Application Client comprises a plurality of pages each with at least one button where the buttons are Navigation Elements. The System Apparatus further comprising a plurality of Elements each with a plurality of Sub-Elements, a Navigation Element, an Actionable Element, a Navigation Rule, a Fillable Element, and a native Logic with an Orchestration, an Update Manager and Native Client Functional Blocks in each of the plurality of pages. The System Apparatus wherein each page can be in use Page State or in a standby Page State. The System Apparatus further comprising a Conditional Navigation determines if a Navigation Element is displayed in a Starting Page and if so what page or pages of a second plurality of pages are linked to the Starting Page.

In accordance with another preferred embodiment of the invention, a System Apparatus comprising a System Solution with at least one first server coupled to at least one Computing device, a Business Entity Data of a Business Entity loaded on a server, fillable entries of Dashboards filled by the Business Entity, the Dashboards controlled by the System Solution automatically generates a Dynamically Updated Data Model, and the Dynamically Updated Data Model and an Automatic Application Update Generator automatically generates a set of Dynamically Updated Applications Clients. The System Apparatus further comprising the set of Dynamically Updated Applications Clients includes a Dynamically Updated Native Mobile Application Client, a set of Dynamically Updated Native Non-Native Mobile Application Client, a Dynamically Updated Non-Native Mobile Application Client, Dynamically Updated Non-Mobile and Cloud Application Clients and a Dynamically Updated Searchable Application Representation. The System Apparatus further comprising each the Dynamically Updated Applications Client are downloaded to a corresponding Client Device via a Communication network. The System Apparatus further comprising each page of the Dynamically Updated Application Client comprises a Page Surface and a Page Foundation, and the Page Surface can be changed dynamically via Dashboards, and the System Apparatus further comprising each Page Surface comprises a least one Dynamic Element, at least on Dynamic Sub-Element, and a Navigation Parameters, a Dashboard Widgets and the Page Surface coupled to an Automatic Dashboard Generator; and the Automatic Dashboard Generator automatically generates Dashboards, Dashboard Validation Rules, and Dashboards Consistency Rules, and the System Apparatus further comprising the Dashboard Validation Rules and the Dashboards Consistency Rules generate a plurality of Validation Controllers to show a validity and a consistency of the Dynamically Updated Data Model, and the plurality of Validation Controllers show the validity and the consistency of the set of Dynamically Updated Applications Clients.

In accordance with another preferred embodiment of the invention, a method of checking for Updates continuously on an Application Server comprising the steps of providing a plurality of Page Surfaces, providing an Update Manager in a Native Layer that runs a Dynamic Update Protocol with the Application Server, checking the Application Server with the Dynamic Update Protocol continuously for Updated Page Surfaces or new Page Surfaces, downloading only the Updated Page Surfaces or the new Page Surfaces automatically to a Dynamic Layer of a Two-Layer Application Client, and checking continuously and downloading the Updates to the Two-Layer Application Client from the Application Server. The method whereby the Two-Layer Application Client is a Two-Layer Native Mobile Application Client or a Two-Layer Native Non-Mobile Application Client. The method further comprising the steps of providing a plurality of Elements with an Element Dynamic Property in a Page Surface, providing a plurality of Sub-Elements with a Sub-Element Dynamic Property in the Page Surface, minimizing bandwidth usage in a Communications network by not downloading Non-Updated Sub-Elements, Non-Updated Elements, or Non-Updated Page surfaces from the Application Server to the Two-Layer Application Client. The method further comprising the steps of allowing a Business entity to change the functionality without the approval of the Application Store. The method further comprising the steps of changing the functionality without stopping, deleting, and re-installing the Two-Layer Application Client, and changing the functionally while the Two-Layer Application Client is running.

BRIEF DESCRIPTION OF THE DRAWINGS

Please note that the drawings shown in this specification may not necessarily be drawn to scale and the relative dimensions of various elements in the diagrams are depicted schematically. The inventions presented here can be embodied in many different forms and should not be construed as limited to the embodiments set forth herein. Rather, these embodiments are provided so that this disclosure will be thorough and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 1A depicts a Client Device coupled to a server and an Application Store and provides some examples of Client Devices.

FIG. 1B depicts a Client Device coupled to a client/server.

FIG. 9A illustrates an Application Client with a plurality of Pages each with a plurality of buttons in accordance with the present invention.

FIG. 9B depicts a button in a Starting Page navigating to an Ending Page in accordance with the present invention.

DETAILED DESCRIPTION OF THE INVENTION

Figure 2A:
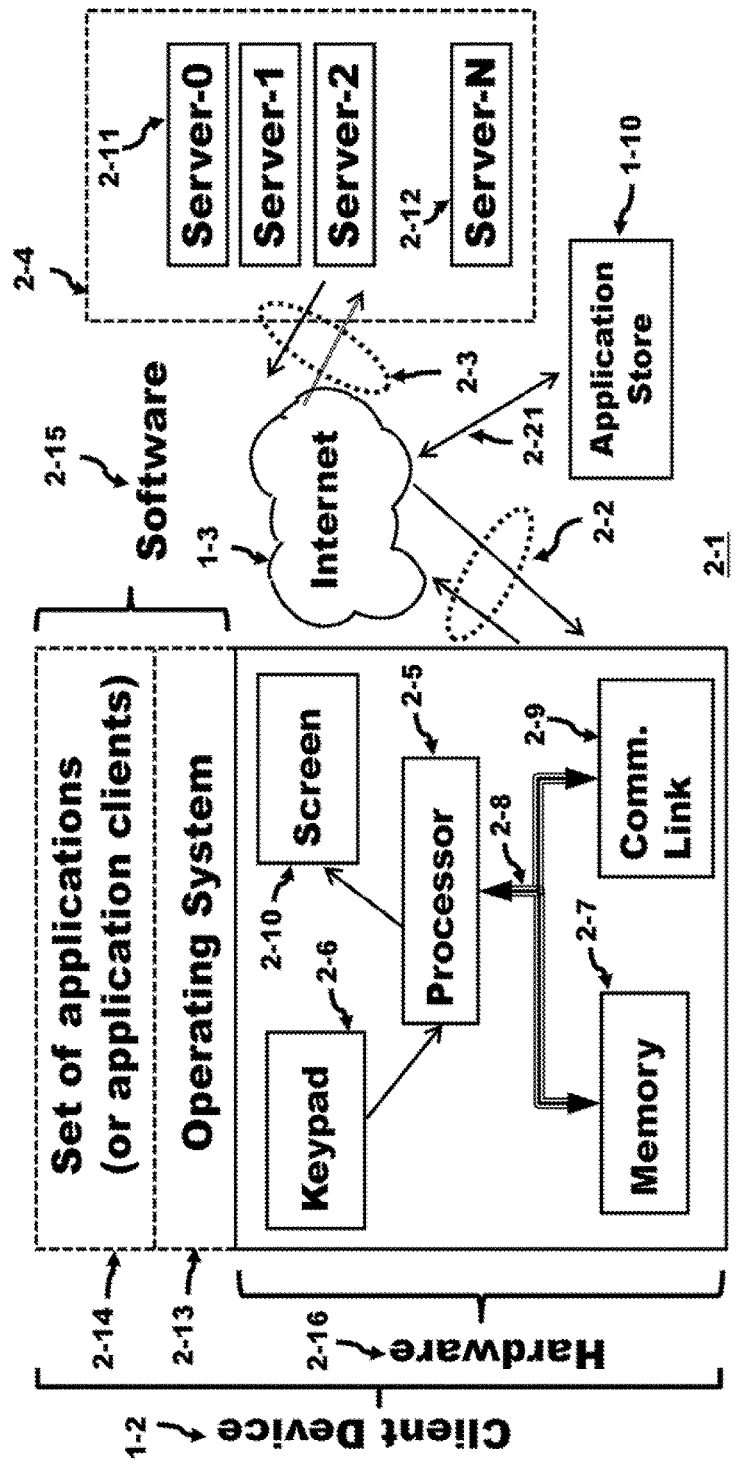
FIG. 2A shows a Client Device with a coupling to a bank of servers, an Application Store, and the internal hardware/software structure of the Client Device.
Figure 2B:
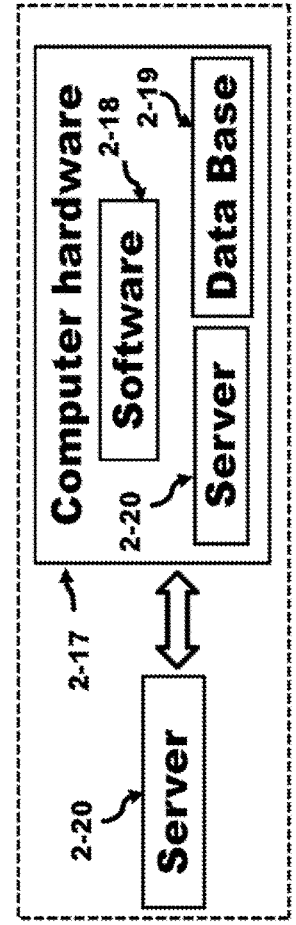
FIG. 2B depicts a more detailed description of a server being a subset of Computer hardware with software, a Database and the server.
Figures 3A, 3B:
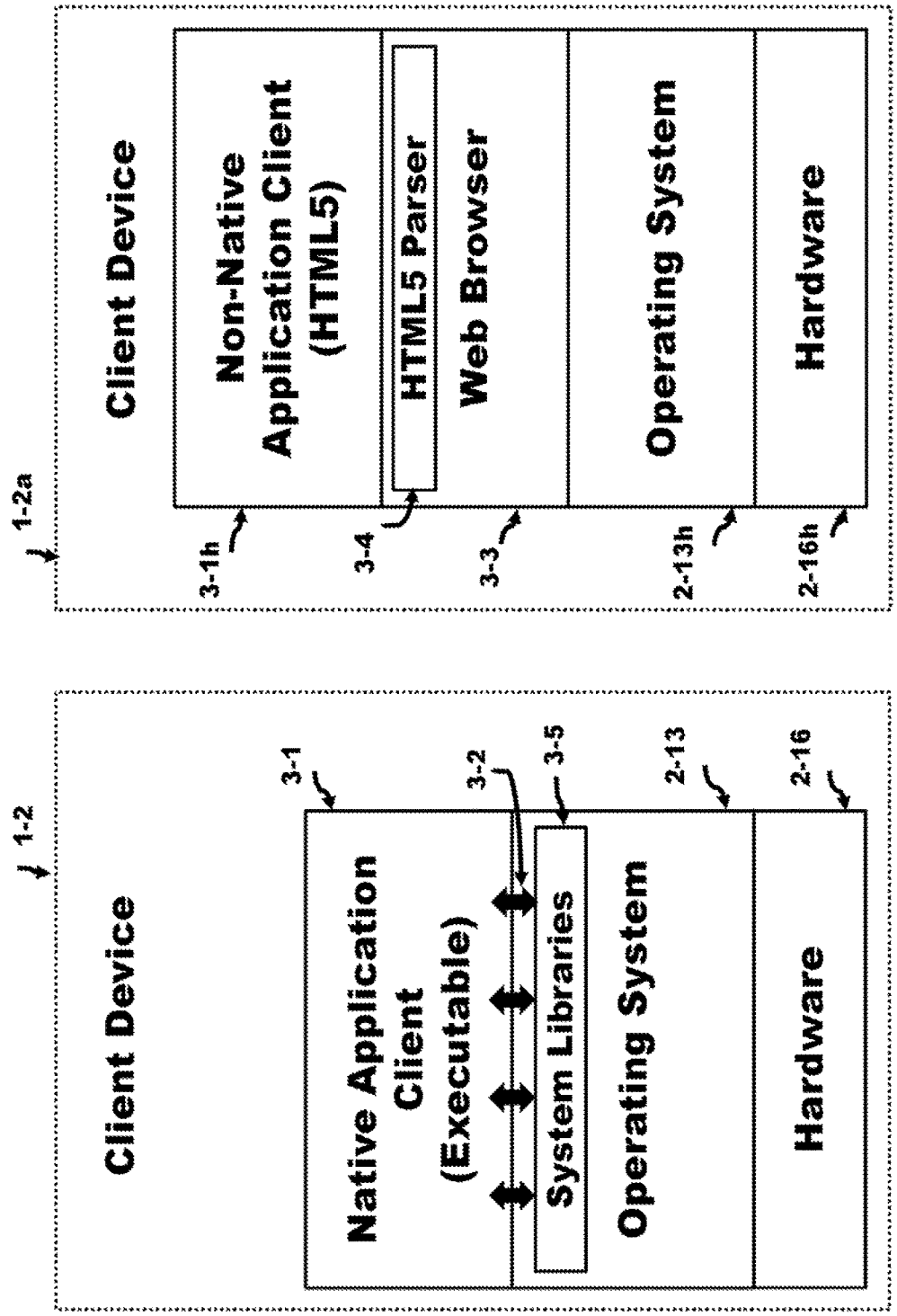
FIG. 3A presents a Native Application Client and how it relates to the layered stacks of the hardware/software representation of a Client Device.
FIG. 3B illustrates a Non-Native Application Client and how it relates to the layered stacks of the hardware/software representation of a Client Device.

The System Solution offers the ownership, control and beneficial use of this inventive idea. The System solution offers the beneficial use to the Business Entity by providing Applications for the Business Entity. The Applications provided by the System Solution comprise a plurality of Application Components, and include Native Application Clients that run on Mobile, Non-Mobile, and Cloud Client Devices. These Native Application Clients can be modified by the Business Entity using Dashboards and can be downloaded to the Client Devices without the Business Entity having to submit the modified Native Application Client to the corresponding Application Store. The System Solution is the owner of all Application Components automatically generated by the System Solution. The System Solution creates and hosts Applications for different Business Entities (each Business Entity is a System Solution customer). The System Solution provides a complete environment for the creation, hosting, updating, and management of the Application. The Application Servers generated by the System Solution for all Business Entities are hosted in a multi-tenant environment in the Cloud, but each Business Entity "feels" like it is provided a dedicated Application Server. The System Solution architecture also applies with minor changes to a scenario where the System Solution Application Server run on dedicated servers owned by the Business Entity, rather than in the Cloud. In this scenario, the System Solution has access to control and offer beneficial use for those servers that are coupled to the Cloud.

Business Entities deploy their Applications to reach Consumers (i.e., the customers of that Business Entity served by System Solution). The Consumers are the primary End Users of the Application Clients generated by the System Solution. The Business Entities are the End Users of the Dashboards and the Application Server that the System Solution provides to each Business Entity for managing the corresponding Application.

Mobile Client Devices (cellular phones, smartphones, wearable devices, and tablets) and Non-Mobile Client Devices (laptops, desktops, and Internet-enabled TV sets) are coupled to the internet by wired (a physical interconnect), wirelessly (waves through space), or both wired/wireless networks. The wireless connectivity can be cellular (3G, 4G, etc.), Wi-Fi, Bluetooth, WiMax, etc. The network interconnecting these components is called the Communication network. The Client Device has the Application Client which is the actual application software running on device.

The term "Mobile" when used alone or in a larger phrase "Mobile Client Devices" can also imply the terms Mobile, Non-Mobile or in the Cloud. The term Mobile Client at times will be referred to as the Client Device. The term Application highlights the fact that the application built by the System Solution comprises a plurality of Application Components, and includes a portion of the Application that runs on the Client Device (the Application Client) and a portion of the application that runs on a server (the Application Server). The term "Application Client" refers to the portion of the application running on the Client Device and is used to refer to both Native and Non-Native Application Client. The term "Application Client" encompasses the Application Client running on a mobile Client Device, a non-mobile Client Device or even in the Cloud. The term "Mobile Application Client" will be used for both Native and Non-Native Application Clients running on a mobile Client Device, but it also applies to Client Devices that are non-mobile or in the Cloud. The Cloud can run a portion of the Application Client in the server while the remaining portion of the Application Client can run on the Client Device, simultaneously. The Application Client can be a part of the software running on the mobile or non-mobile Client Device or can be partially in the Cloud. In all cases, the Client Devices provide the End User with at least one mode of input and at least one mode of output through which the End User navigates and interacts with the Application Client.

Each Application includes a family of Application Clients. Each Application Client corresponds to a certain Client Device. The family of Application Clients includes a set of Native Mobile Application Clients, one per mobile platform. The family of Application Clients also includes a set of Native Non-Mobile Application Clients, one per non-mobile platform. The family of Application Clients also includes Non-Native Mobile and Non-Mobile Application Clients, and Application Clients residing in the Cloud. Some examples of the mobile platforms include the iPhone™, iPad™, Android™ phones, or tablets while the non-mobile platforms include the Apple Mac Operating System and the Microsoft Windows Operating System. For convenience, we use the term Mobile Application Client (or more succinctly Mobile Client) to refer to any Mobile Client in the family of Mobile Clients corresponding to an Application generated by the System Solution.

Figure 5:
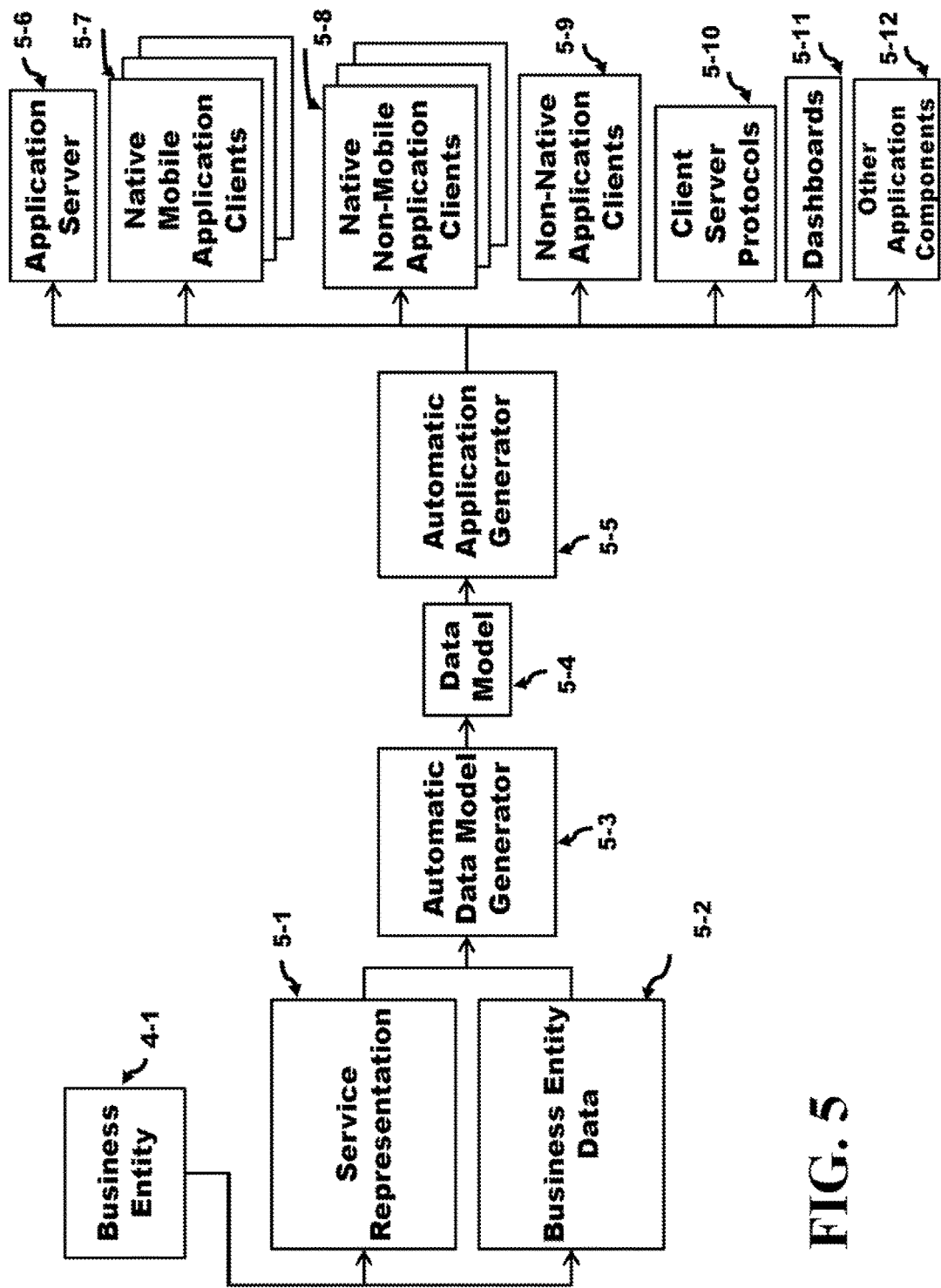
FIG. 5 depicts a description of automatically generating client applications in accordance with the present invention.

FIG. 5 depicts a method and apparatus to automatically generate an Application consisting of several Application Components. A Business Entity 4-1 defines a Service Representation 5-1 and Business Entity Data 5-2. An Automatic Data Model Generator 5-3 takes the Service Representation 5-1 and the Business Entity Data 5-2 as inputs and automatically generates a Data Model 5-4. Using the generated Data Model 5-4, an Automatic Application Generator 5-5 automatically generates all the Application Components. The generated Application Components include an Application Server 5-6, a set of Native Mobile Application Clients 5-7, a set of Native Non-Mobile Application Clients 5-8, a set of Non-Native Application Clients 5-9, Client Server Protocols 5-10, Dashboards 5-11, and Other Application Components 5-12. The set of Native Mobile Application Clients 5-7 comprises a Native Application Client executable for each mobile Client Device that the Native Mobile Application Client is desired to run on. The set of Native Non-Mobile Application Clients 5-8 comprises a Native Non-Mobile Application Client executable for each non-mobile Client Device that the Native Non-Mobile Application Client is desired to run on. The method and apparatus depicted in FIG. 5 is explained in detail in the co-filed U.S. patent application Ser. No. 13/833,589 titled "Apparatus for Single Workflow for Multi-Platform Mobile Application Creation and Delivery" and in U.S. patent application Ser. No. 13/833,669 titled "Method for Single Workflow for Multi-Platform Mobile Application Creation and Delivery" filed on Mar. 15, 2013, which are incorporated in reference in their entirety. What is relevant in this application is that Native Mobile Application Clients 5-7, Native Non-Mobile Application Clients 5-8, and Non-Native Application Clients 5-9 are automatically generated from the Service Representation 5-1 and Business Entity Data 5-2. Further, the generated Dashboards 5-11 can be used to modify the generated Native Mobile Application Clients 5-7, Native Non-Mobile Application Clients 5-8, and Non-Native Application Clients 5-9.

The process of updating a Native Application Client is time consuming, costly, and laborious, and it cannot be performed "on the fly" while the Native Application Client is running on the Client Device. When the Business Entity updates the Native Application Client, it has to re-submit the new version of the Native Application Client for approval to the Application Store, which is a time-consuming, costly, and laborious process. Because of such a required process, there is a considerable lag from the time the Business Entity updates the Native Application Client to the time the new version of the Native Application Client is made available for download in the Application Store. Further, a Client Device which desires the new version of the Native Application Client must go back to the Application Store to again download and re-install the Native Application Client. If the existing Native Application Client is running on the Client Device, it must first be stopped and deleted before the new version of the Native Application Client is installed. The Native Application Client cannot be updated "on the fly" while it is running on the Client Device. The update and re-installation process is a time-consuming and inconvenient process. The user experience of the Native Application Client is disrupted while the Native Application Client is terminated and re-installed.

Figure 6:
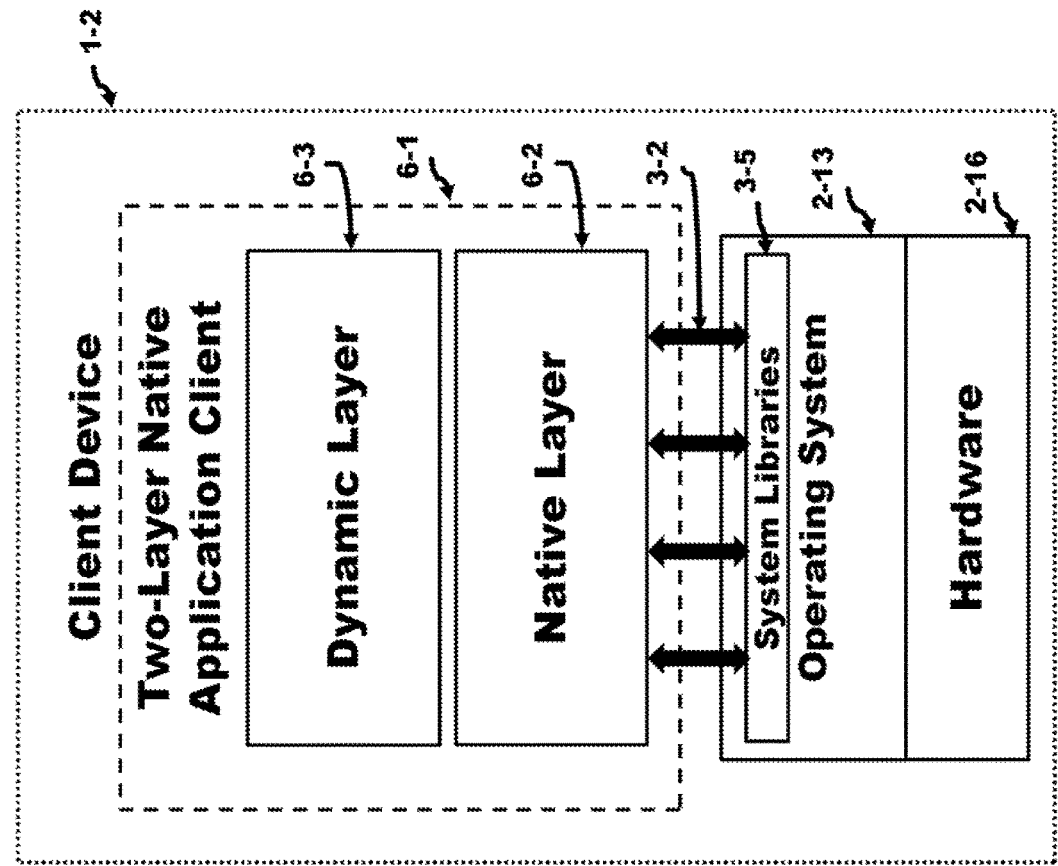
FIG. 6 shows a Two-Layer Application Client in a Client Device in accordance with the present invention.

FIG. 6 depicts a Two-Layer Native Application Client 6-1 which is a Native Application Client that consists of two layers: a Dynamic Layer 6-3 and a Native Layer 6-2. The Native Layer 6-2 runs 3-2 directly on the Operating System 2-13 of the Client Device 1-2 by using the system libraries 3-5 that are part of the Operating System 2-13. The Operating System in turn runs on the hardware 2-16. The Dynamic Layer 6-3 does not run directly on the Operating System 3-5, but instead runs on the Native Layer 6-2 by making use of software libraries and functional blocks provided in the Native Layer 6-2. The Native Layer 6-2 and the Dynamic Layer 6-3 together implement the functionality and user experience offered by the Two-Layer Native Application Client 6-1. The Native Layer 6-2 is an executable that depends on the Client Device 1-2 and needs to be downloaded and installed on the Client Device 6-2 using an installation manager external to the Two-Layer Native Application Client 6-1. The Native Layer 6-2 needs to be downloaded from the Application Store. The Dynamic Layer 6-3 does not need to be downloaded from the Application Store, but can be downloaded directly from an Application Server that is part of the System Solution. We use the term "Dynamic Native Application Client" as synonymous of the term "Two-Layer Native Application Client".

Figure 4A:
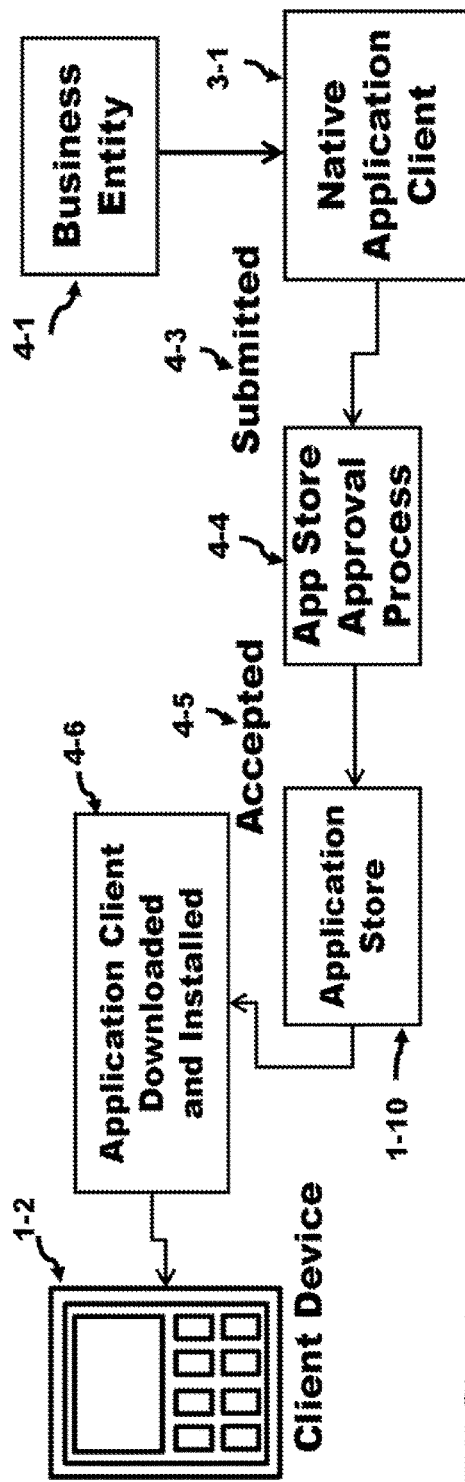
FIG. 4A shows the flow of how a Native Application Client is approved and downloaded by an Application Store to a Client Device.
Figure 4B:
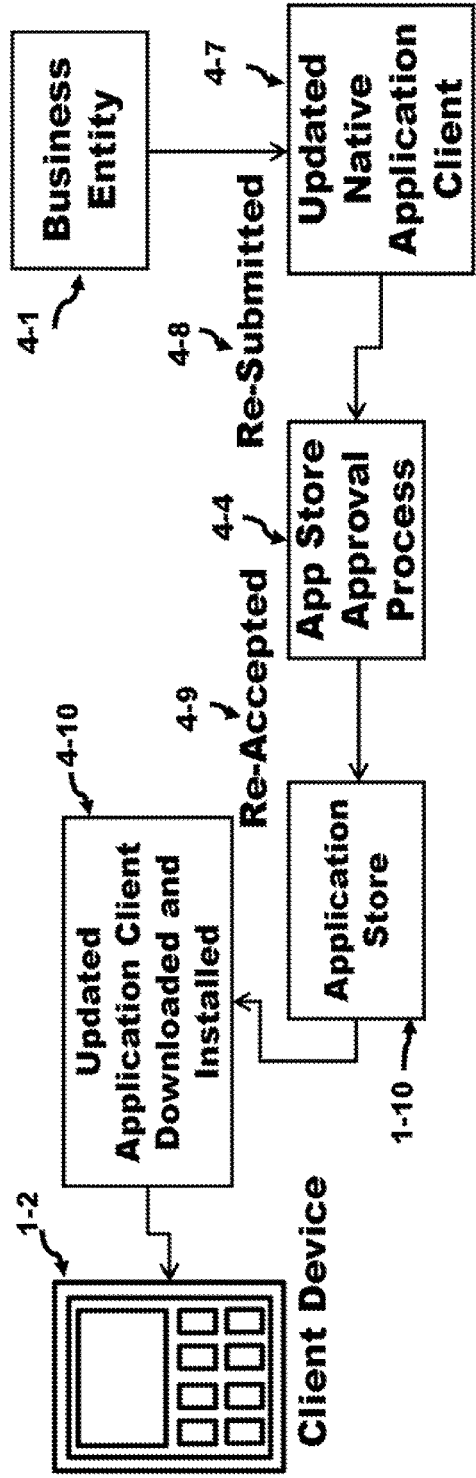
FIG. 4B illustrates the flow of how a new Updated Native Application Client is approved and downloaded by an Application Store to a Client Device.
Figure 7:
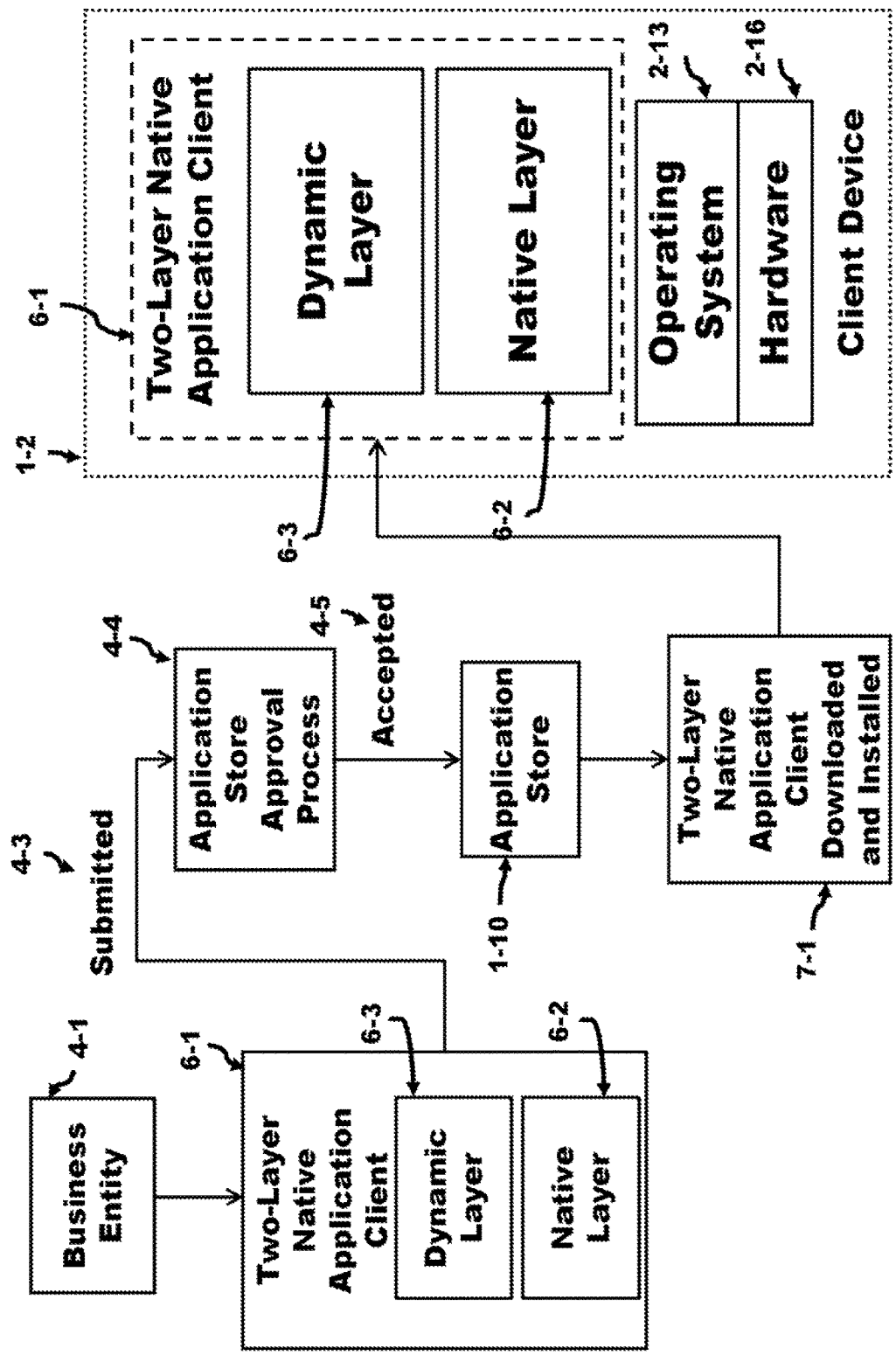
FIG. 7 presents a Business Entity submitting a Two-Layer Application Client for approval and download to an Application Store for availability to other Device Clients in accordance with the present invention.

FIG. 7 illustrates the process of downloading the Two-Layer Native Application Client 6-1 to a Client Device 1-2 for the first time. This process is similar to the process of downloading a Native Application Client 3-1 to the Client Device depicted in FIG. 4A. A Business Entity 4-1 creates a new application which comprises a Two-Layer Native Application Client 6-1. The Two-Layer Native Application Client 6-1 has a Dynamic layer 6-3 and a Native Layer 6-2. The new Two-Layer Native Application Client 6-1 is submitted 4-3 to the Application Store 1-10 for an approval process 4-4. Once the new Two-Layer Native Application Client is accepted 4-5, information is passed to the Application Store 1-10 to make the new Two-Layer Native Application Client available for download 7-1 into a Client Device 1-2. A Client Device 1-2 which desires the Two-Layer Native Application Client 6-1 downloads the Two-Layer Native Application Client from the corresponding Application Store 1-10. For example, an iPhone™ downloads its desired Native Application Client from the Apple™ Application Store, an Android™ device downloads its desired Native Application Client from the Android™ Application Store, etc. Once the Two-Layer Native Application Client is downloaded to the Client Device, it is installed 7-1 on the Client Device so it can run on the Operating System 2-13 of the Client Device. The Operating System in turn runs on the hardware 2-16. The Two-Layer Native Mobile Application Client 6-1 executable depends on the Operating System (OS) as an iPhone would require a different executable than an Android™ phone If the Business Entity modifies the Native Layer 6-2, it needs to submit the new version of the Native Layer 6-2 to the Application Store for re-approval in order to make it available for download to the Client Device. In order to install the updated version of the Native Layer on the Client Device, the existing version of the Native Layer, if running on the Client Device 1-2, must be stopped and deleted from the memory of the Client Device 1-2 in order for the new version of the Native Layer to be installed on the Client Device. The Native Layer cannot be updated "on the fly" while the Native Application Client 3-1 is running on the Client Device 1-2.

Figure 8:
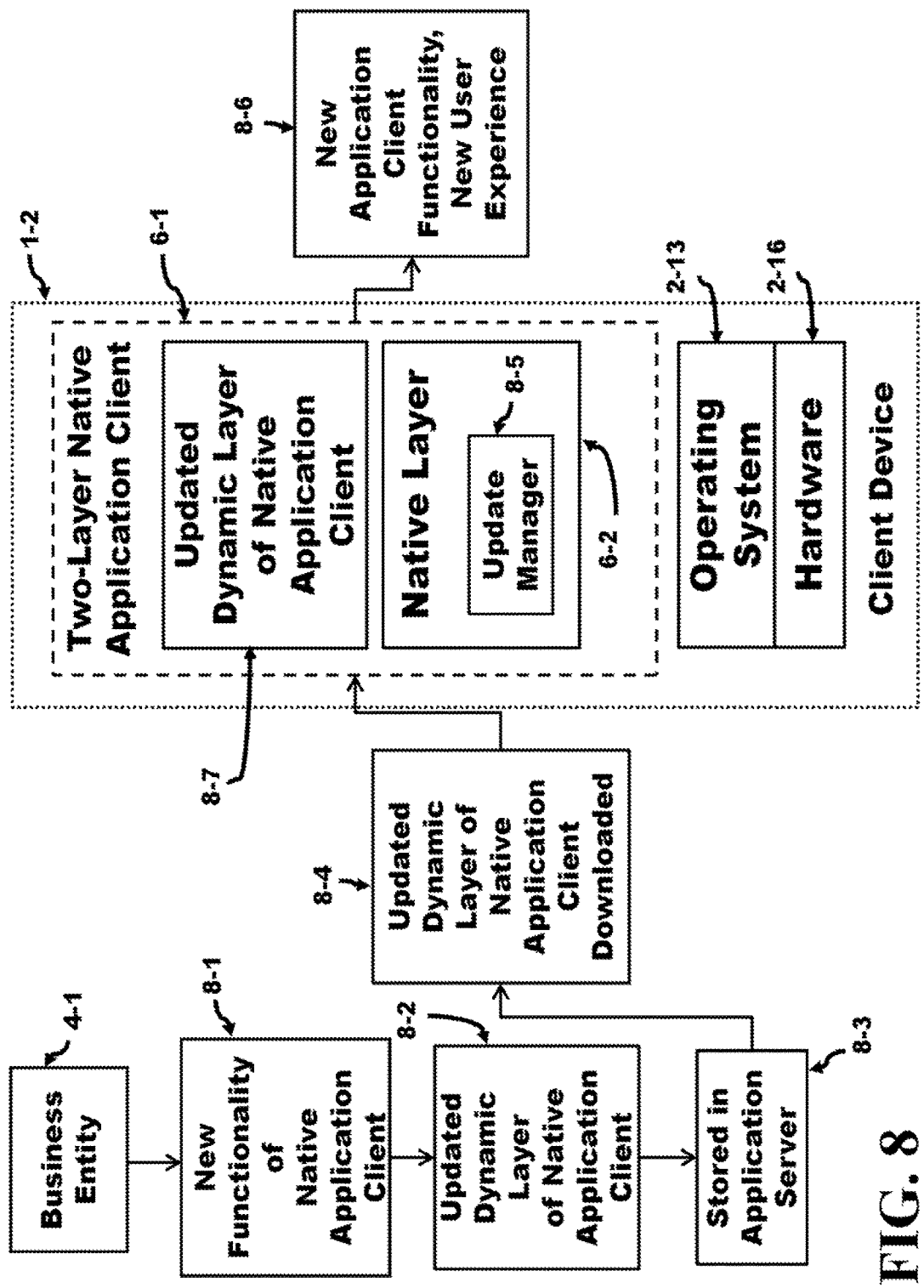
FIG. 8 shows a Business Entity submitting an Updated Dynamic Layer of a Native Application Client for availability to other Device Clients via an Application Server in accordance with the present invention.

FIG. 8 illustrates the process of downloading an updated Dynamic Layer 8-2 to the Client Device. If the Business Entity 4-1 desires a New Functionality of the Native Application client 8-1, the Business Entity 4-1 modifies the Dynamic Layer 6-3 and creates an Updated Dynamic Layer 8-2, the Updated Dynamic Layer 8-2 is available for download directly from an Application Server 8-3 that is part of the System Solution or is owned by the Business Entity. The new version of the Updated Dynamic Layer 8-2 of the previous Dynamic Layer 6-3 is made available for download to the Client Device without having the Business Entity submit it for approval to the Application Store 1-10. The updated Dynamic Layer 8-4 is downloaded and installed 8-4 in the Client Device 1-2 while the Two-Layer Native Application Client 6-1 is running on the Client Device. The update of the existing Dynamic Layer can be achieved using an update manager 8-5 that is internal in the Native Layer 6-2 of the Two-Layer Native Application Client 6-1. Once the Updated Dynamic Layer 8-7 is installed on the Client Device 1-2, the new application client functionality and new user experience 8-6 is provided to the end user. As before, the Operating System 2-13 running on the hardware 2-16 in the Client Device 1-2.

The Two-Layer Native Application Client 6-1 provides several benefits. The Business Entity can change the functionality of the Two-Layer Native Application Client 6-1 without resubmitting the Native Application Client to the approval process of the Application Store, which is laborious and time consuming. The functionality of the Two-Layer Native Application Client 6-1 can be changed "on the fly" while the Native Application Client is running on the Client Device, without disrupting the user experience offered by the Native Application Client. The updated Dynamic Layer 8-2 can be downloaded and installed in the Client Device "automatically" by the Two-Layer Native Application Client using an update manager 8-5 internal to the Native Layer 6-2 of the Two-Layer Native Application Client 6-1. Thus, the Two-Layer Native Application Client 6-1 can be updated "transparently" without requiring any action from the end user. The internal update manager 8-5 can make sure that the Dynamic Layer running on the Client Device 1-2 is always the latest version of the Dynamic Layer 8-7, by querying the Application Server asking whether there is a newer version of the Dynamic Layer than the version of the Dynamic Layer 8-7 currently running on the Client Device, and downloading and installing the latest version when it is made available by the Business Entity 4-1. The updated Dynamic Layer 8-2 is downloaded from an Application Server owned by the System Solution or by the Business Entity, rather than having to be downloaded from the Application Store 1-10.

FIG. 9A illustrates the structure of an Application Client 9-2, including a Native Application Client and a Two-Layer Native Application Client. The Application Client 9-2 comprises a plurality of Pages which comprises Page 1 9-3, Page 2 9-4, Page 3 9-5, and Page N 9-6. The Pages 9-3 to 9-6 are presented to the end user via a User Interface. Buttons in each Page allow the end user to "navigate" from one Page to another. Each Page contains a sub-set of the plurality of Buttons 9-7 to 9-15. Each Button 9-7 to 9-15 connects one Page to another Page in the Application Client 9-2 as illustrated by the arrows coupling the buttons to different pages. When the Application Starts 9-1 on the Client Device, a pre-configured Page in the plurality of Pages 9-3 to 9-6 is displayed to the end user. For example, Page 1 9-3 is displayed to the end user. Then, the end user navigates to the other Pages using the Buttons. We use the term "Navigation Element" as a synonymous of Button to refer to the fact that "Buttons" may assume other forms on the User Interface, to connect one Page to another. Navigation Elements or Buttons include buttons themselves, tabs, navigation bars, tappable elements such as an address, a thumbnail, or a piece of text that when tapped navigates the end user to another Page. Buttons or Navigation Elements can even be "implicit," i.e., not be shown explicitly to the end user. For example, an "implicit" button may navigate the user from one Page to another Page, after a certain time lapses or if a certain event occurs.

FIG. 9B illustrates the navigation of an Application Client, including a Native Application Client and a Two-Layer Native Application Client. A Button 9-17 or Navigation Element is shown on the User Interface of a Starting Page 9-16. If the end user taps or clicks the Button 9-17, it "navigates" to the Ending Page 9-18, meaning that the Application Client 9-2 displays the User Interface of the Ending Page 9-18 to the end user.

The Buttons and the links that they provide among the plurality of Pages 9-3 to 9-6 in the Application Client 9-2 constitute the "Application Flow" of the Application Client. The Application Flow is an important part of the user experience that the Application Client 9-2 offers to the end user.

Figure 10:
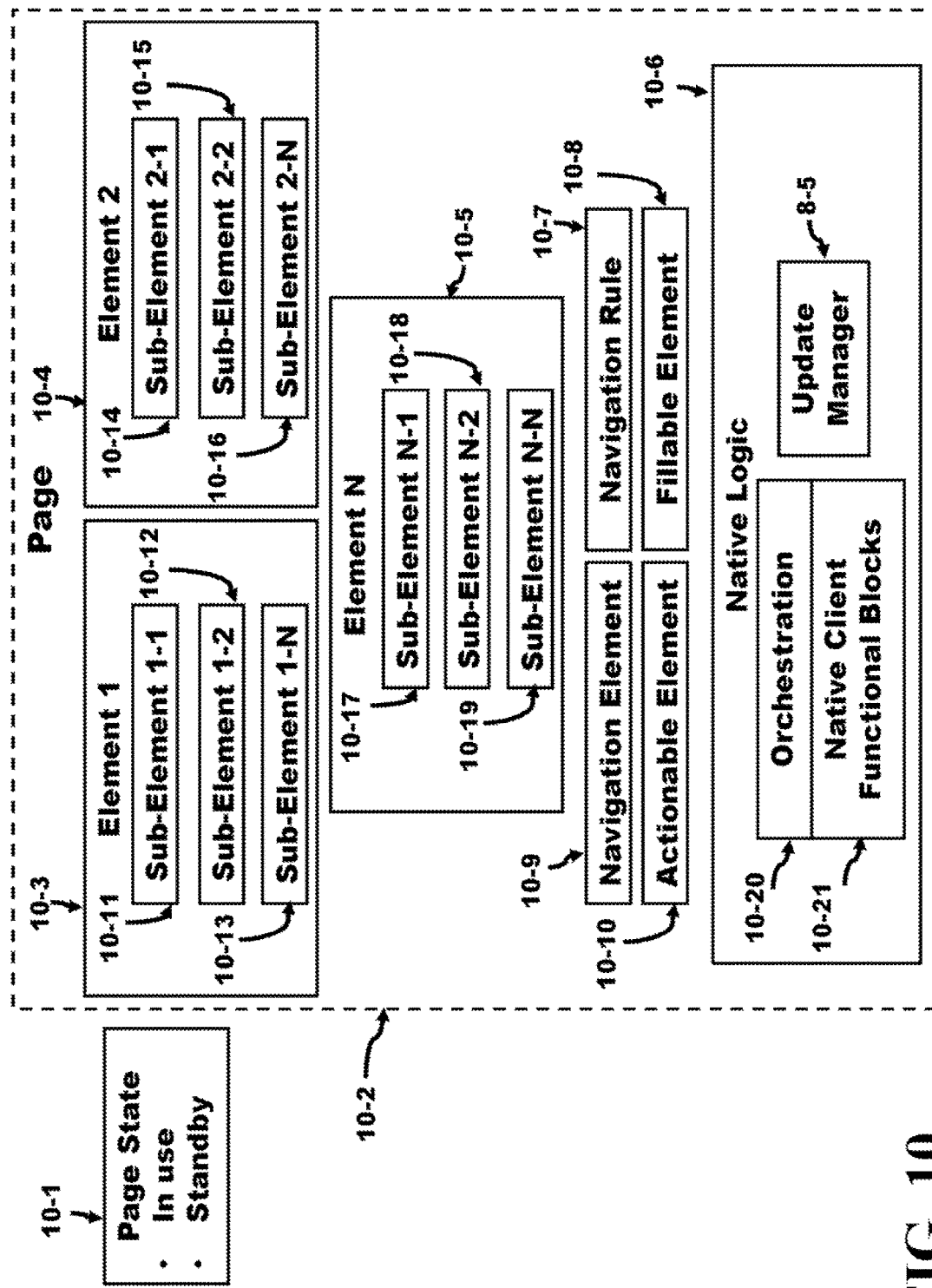
FIG. 10 illustrates the Elements, Sub-Elements. Native Logic, and other components in a Page in accordance with the present invention.

FIG. 10 shows the structure of a Page 10-2 in the plurality of Pages that comprise a Two-Layer Native Application Client. The Page comprises a plurality of Elements comprising Element 1 10-3 to Element N 10-5. In turn, each Element comprises a plurality of Sub-Elements. For example Element 1 10-3 comprises Sub-Element 1-1 10-11 to Sub-Element 1-N 10-13. Element 2 10-4 comprises Sub-Element 2-1 10-14 to Sub-Element 2-N 10-16. Element N 10-5 comprises Sub-Element N-1 10-17 to Sub-Element N-N 10-19. We use the term "Element" to refer to any "part" or block of the Page. For example, an Element 10-3 to 10-5 may be the Page itself, a UI Region (i.e., a portion of the Page), a widget, a building block, a piece of content, a navigation structure, a button, a tab, etc. Examples of Sub-Elements 10-11 to 10-19 include a Background, a Content, Pictures, text, shape, text box, video, position, format, etc. A Background which is typically an image covering the entire area of the Element. The other possibilities includes a Content which includes Pictures and Text, a Picture which is an image, a Shape, a Text Box which is an imaginary "box" defining an area where text is displayed, a Video, a Position which consists of a X-Coordinate and a Y-Coordinate, a Size which consists of a Width and a Height, a Text, and a Format which may include a Font, a Font Size, an Alignment, and a Font Color for a Text Box. For a given Element 10-3 to 10-5, not all Sub-Elements may exist or even apply. Sub-Elements 10-11 to 10-19 are used only in an "as needed fashion" to provide finer granularity in identifying the "parts of the Two-Layer Native Application Client 6-1 that should become part of the Dynamic Layer 6-3 in order to optimize Client/Server communication and Two-Layer Native Application Client dynamic behavior One or more of Elements 10-3 to 10-5 are associated with a function, an action, or data. They are called Actionable Elements 10-10. For example, a line of text containing the Expiration Date of a Promotion is an Actionable Element, which is used by the Application Client to validate whether that Promotion is still active or needs to be retired. One or more of Elements 10-3 to 10-5 are associated with data that should be filled. They are called Fillable Elements 10-8. There are three types of Fillable Elements 10-8. A Locally Fillable Element contains data that should be filled locally (i.e., using logic and data available in the Application Client) when the Element is displayed. For example, a Service which greets the Consumer by first name, may use a text Fillable Element which gets filled by the end user's first name. A Server Fillable Element contains data that should be filled by the Application Server. The Application Client may request the data from the Application Server using a Client/Server protocol. An Input Element is a Fillable Element which receives an end user's action that needs to be communicated to the Application Client or Application Server. One or more of Elements 10-3 to 10-5 are Navigation Elements 10-9 or Buttons.

The Page 10-2 also includes one or more Navigation Rule 10-7. A Navigation Rule is associated with a Navigation Element 10-9 or button and defines the "navigation" provided by the Navigation Element 10-9.

The Page 10-2 includes Native Logic 10-6 which consists of an Orchestration 10-20, a set of Native Client Functional Blocks 10-21 and an Update Manager 8-5. The Native Client Functional Blocks 10-21 are described in detail in the co-filed U.S. patent application Ser. No. 13/833,589 titled "Apparatus for Single Workflow for Anti-Platform Mobile Application Creation and Delivery" and in U.S. patent application Ser. No. 13/833,669 titled "Method for Single Workflow for Multi-Platform Mobile Application Creation and Delivery" filed on Mar. 15, 2013, which are incorporated in reference in their entirety.

A Page can be in one of two Page State 10-1. A Page in "In Use" Page State is a Page currently displayed to the end user by the Native Application Client. A Page in "Standby" Page State is a Page prepared in the Two-Layer Native Application Client for future use or use in the context of a certain Service, but not currently displayed to the Consumer.

Figure 11:
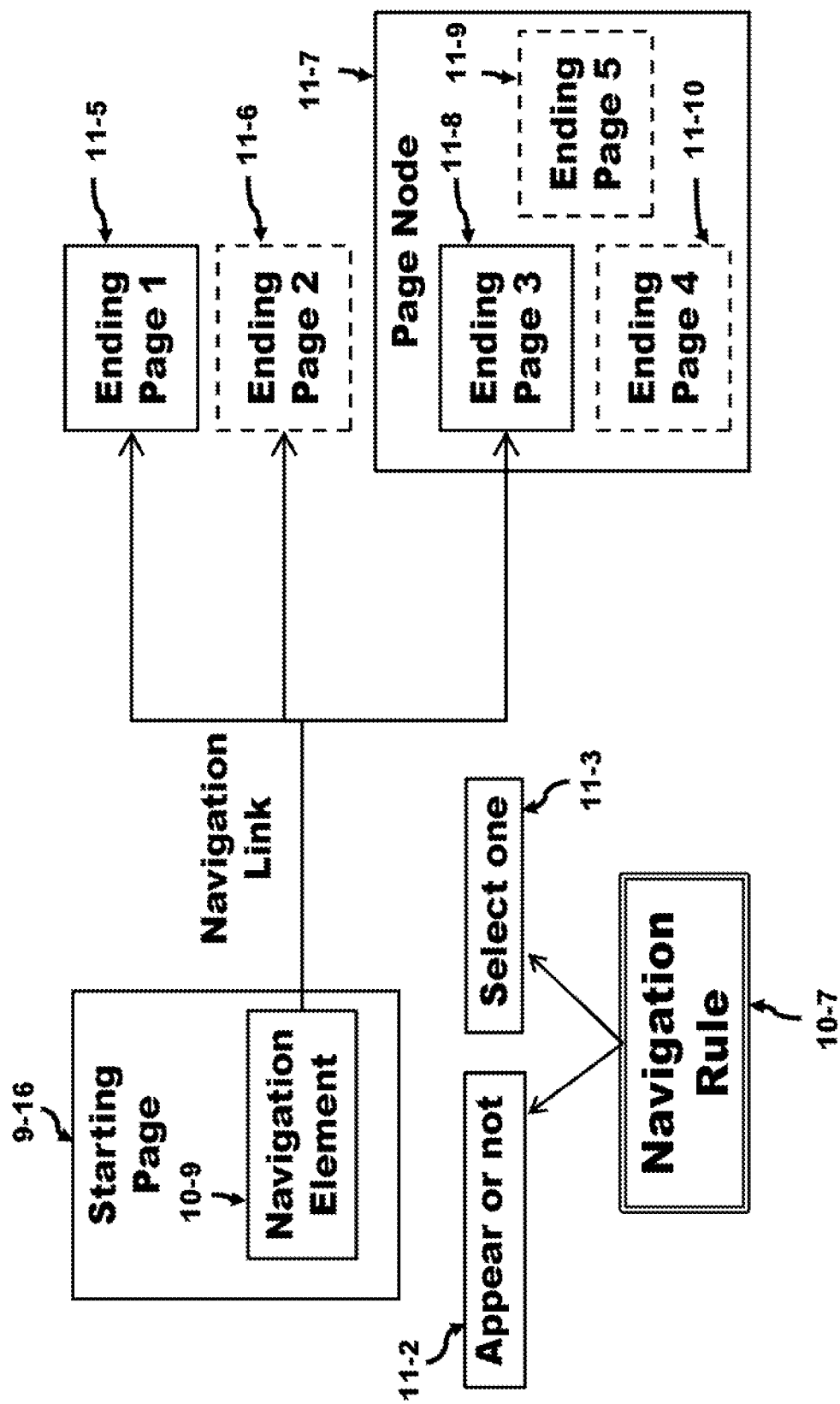
FIG. 11 shows a Navigation Rule, Navigation Element, and Navigation Link in accordance with the present invention.

FIG. 11 depicts the behavior of a Navigation Rule 10-7, which is associated to a Navigation Element 10-9 which is part of a Starting Page 9-16 in the plurality of Pages comprised in a Two-Layer Native Application Client. The Navigation Rule is evaluated when the Two-Layer Native Application Client 6-1 runs on the Client Device 1-2 and determines the behavior of the associated Navigation Element 10-9. Based on the result of the evaluation of the Navigation Rule 10-7, it is determined whether the Navigation Element 10-9 should "Appear or not" 11-2 on the User Interface of the Starting Page 9-16. Also, based on the result of the evaluation of the Navigation Rule 10-7, it is determined which ending page among a plurality of Ending Pages 11-5 to 11-6 should be linked to the Starting Page 9-16 by the Navigation Element 10-9. Based on the result of the evaluation of the Navigation Rule 10-7, it is determined whether the Navigation Element 10-9 should "Select one" 11-3. The Ending Pages in the plurality of Ending Pages 11-5 to 11-6 may be in "In Use" Page State or in "Standby" Page State. Ending Pages in "In Use" Page State are depicted in FIG. 11 using a solid line, for example Ending Page 1 11-5. Ending Pages in "Standby" Page State are depicted in FIG. 11 using a dotted line, for example Ending Page 2 11-6. The plurality of Ending Pages that can be associated with the Navigation Element 10-9 may also include one or more Page Node 11-7. A Page Node 11-7 contains a plurality of Pages 11-8 to 11-10 of which at most one is linked to the Navigation Element 10-9 at any given time. The Page in the plurality of Pages contained in the Page Node that is associated with the Navigation Element 10-9 at any given time is determined based on the Page State of the Pages in the Page Node and on other conditions, for example the location of the Client Device 1-2. For example, a Page Node 11-7 may comprise a plurality of Pages of which only one Page is in "In Use" Page State at any given time. The Page in "In Use" Page State at any given time is chosen as the Ending Page associated with the Navigation Element at that time. In another example, a Page Node comprises two Pages, both Pages in "In Use" Page State. Which Page is chosen as the Ending Page associated with the Navigation Element at any given time is determined based on the location of the Client Device 1-2 at that time. For example, a first Page is chosen as the Ending Page if the current Client Device location is inside a store and a second Page is chosen as the Ending Page if the current Client Device location is outside the store. Similarly to Pages, A Page Node 11-7 is in one of two Page States. A Page Node is in "In Use" Page State if at least one of the Pages contained in the Page Node is in "In Use" Page State. A Page Node is in "Standby" Page State if all the Pages contained in the Page Node are in "Standby" Page State.

Figure 12:
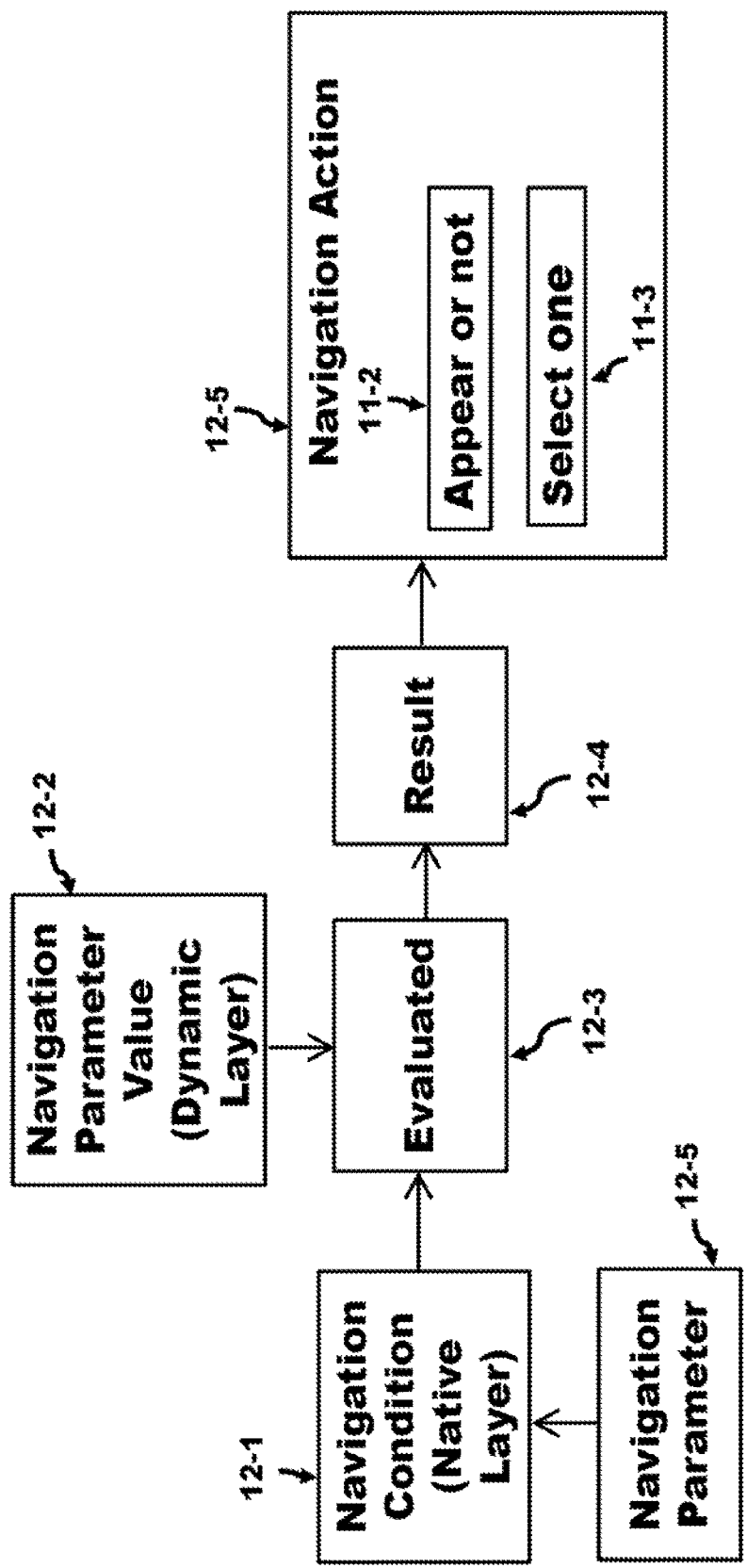
FIG. 12 illustrates the way the Navigation Rule operates in accordance with the present invention.

FIG. 12 depicts the structure and operation of a Navigation Rule 10-7. A Navigation Condition 12-1 is part of the Native Layer 6-2 of the Two-Layer Native Application Client 6-1. The Navigation Condition 12-1 contains at least one Navigation Parameter 12-5. The Navigation Parameter has a corresponding Navigation Parameter Value 12-2 which is part of the Dynamic Layer 6-3 of the Two-Layer Native Application Client 6-1. The Navigation Condition is Evaluated 12-3 when the Two-Layer Native Application Client 6-1 runs on the Client Device 1-2 and a Result 12-4 is computed. Based on the Result 12-4, the Navigation Action 12-5 that defines the behavior of the Navigation Element 10-9 is determined. The Navigation Action 12-5 is at least one of the "Appear or not" 11-2 or "Select one" 11-3 navigation actions, described in FIG. 11.

Figure 13:
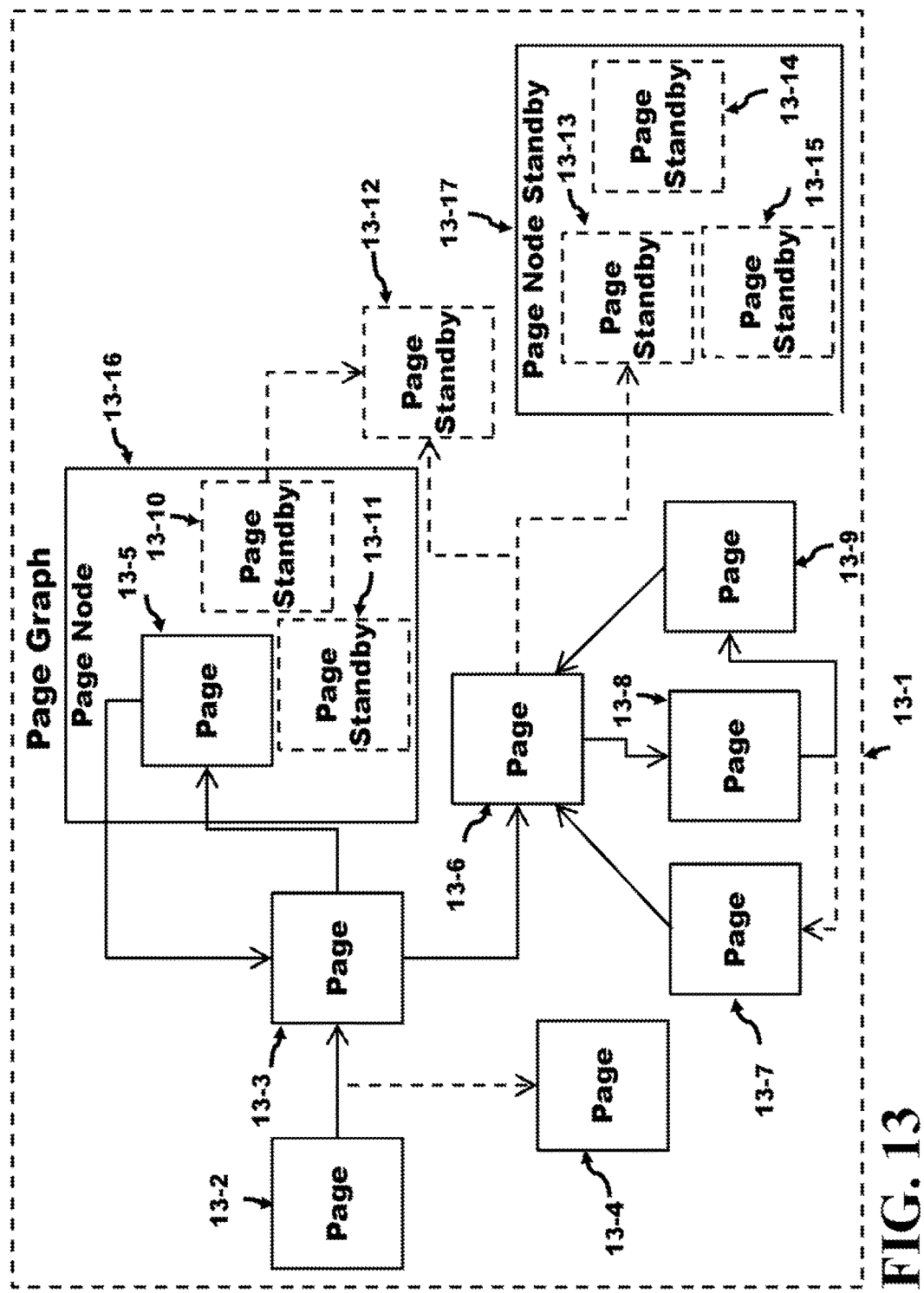
FIG. 13 depicts a Page Graph that captures all the Navigation Rules and navigation Links in all the Pages in accordance with the present invention.

FIG. 13 depicts the Page Graph 13-1 for a Two-Layer Native Application Client 6-1. The Page Graph 13-1 consists of all the Navigation Rules and associated Navigation Actions and all the Navigation Links associated with all the Navigation Elements 10-9 in the Two-Layer Native Application Client 6-1. The Pages and Page Nodes in the Page Graph 13-1 may be in "In Use" Page State or "Standby" Page State. The Page Graph 13-1 represents the Application Flow of the Two-Layer Native Application Client 6-1, which is an important part of the user experience provided by the Two-Layer Native Application Client to the end user. The Page Graph 13-1 is used to generate the Two-Layer Native Application Client automatically and for updating the Dynamic Layer of the Two-Layer Native Application Client automatically.

The use of Navigation Rules is referred to as "Conditional Navigation." By changing the Navigation Parameter Value 12-2 in the Dynamic Layer 6-3, the Business Entity 4-1 can change the Application Flow of the Two-Layer Native Application Client 6-1 while the Two-Layer Native Application Client is running, and thus can change the behavior of the Two-Layer Native Application Client dynamically. The Business Entity can change the Application Flow of the Two-Layer Application Client 6-1 by generating an updated Dynamic Layer with an updated Navigation Parameter Value 12-2 and making it available in an Application Server owned by the System Solution or by the Business Entity, without the need to resubmit the Two-Layer Native Application Client to the Application Store 1-10. The Navigation Rules can be computed multiple times as the Two-Layer Native Application Client is running on the Client Device 1-2, and different Results 12-4 may be computed based on the Navigation Condition 12-1. The Navigation Condition 12-1 can contain Navigation Parameters based on other conditions. For example, the Navigation Condition 12-1 may contain Navigation Parameters that depend on the location of the Client Device at the time the Navigation Condition 12-1 is Evaluated 12-3. For example, the Navigation Condition 12-1 when Evaluated 12-3 in a first location provides a first Result 12-4. The same Navigation Condition 12-1 when Evaluated 12-3 in a second location provides a second, different Result. Different Results produce different Navigation Actions, which in turn change the Application Flow of the Two-Layer Native Application Client based on those conditions. Thus, the behavior of the Two-Layer Native Application Client can change dynamically.

The Page Graph 13-1 depicted in FIG. 13 shows the "actual" Application Flow at a given time, by showing the "result" of the Navigation Rules at that time, which is represented by the "actual" links between pages once the Navigation Rules are evaluated at that time, and the Page State of all the available Pages at that time. The Pages which are "In Use" Page State are shown with a solid line, for example, Page 13-2 to Page 13-9 are "In Use" pages. The "Standby" Page States are shown with a dotted line and includes page 13-10 to 13-15. The Page Node 13-16 only has one "In Use" Page Mode belonging to page 13-5 while the remaining pages 13-10 and 13-11 are in "Standby" Page Mode. The Page Node 13-17 illustrates all its internal pages 13-13 to 13-15 in the "Standby" Page Mode, and thus the Page Node 13-17 is in Standby Page State. A Navigation Element that has no associated Navigation Rule is represented by a single solid arrow, for example the link between Page 13-3 and Page 13-6. A Navigation Element that is associated with a Navigation Rule with a Navigation Action 12-5 "Select One" 11-2 is represented by more than one, one arrow per possible ending page. One of such arrows is a solid arrow, which represents the Ending Page that is selected at that time, the other arrows are dotted arrow, which represent the links that are not selected at that time. For example, the link from Page 13-2 to Page 13-3 is selected by a corresponding Navigation Rule at that time, while the link between Page 13-2 and 13-4 is not selected by such Navigation Rule at that time. The Navigation rules allow the user to navigate along the solid line between Pages while the dotted lines between pages prevent the user from navigating between these Pages. A Navigation Element that is associated with a Navigation Rule with a Navigation Action 12-5 "Appear or Not" 11-3, is represented by a solid arrow when the result of the associated Navigation Rule is for the Navigation Element to "Appear" and is represented by a dotted arrow when the result of the associated Navigation Rule is "Do Not Appear".

Figure 14:
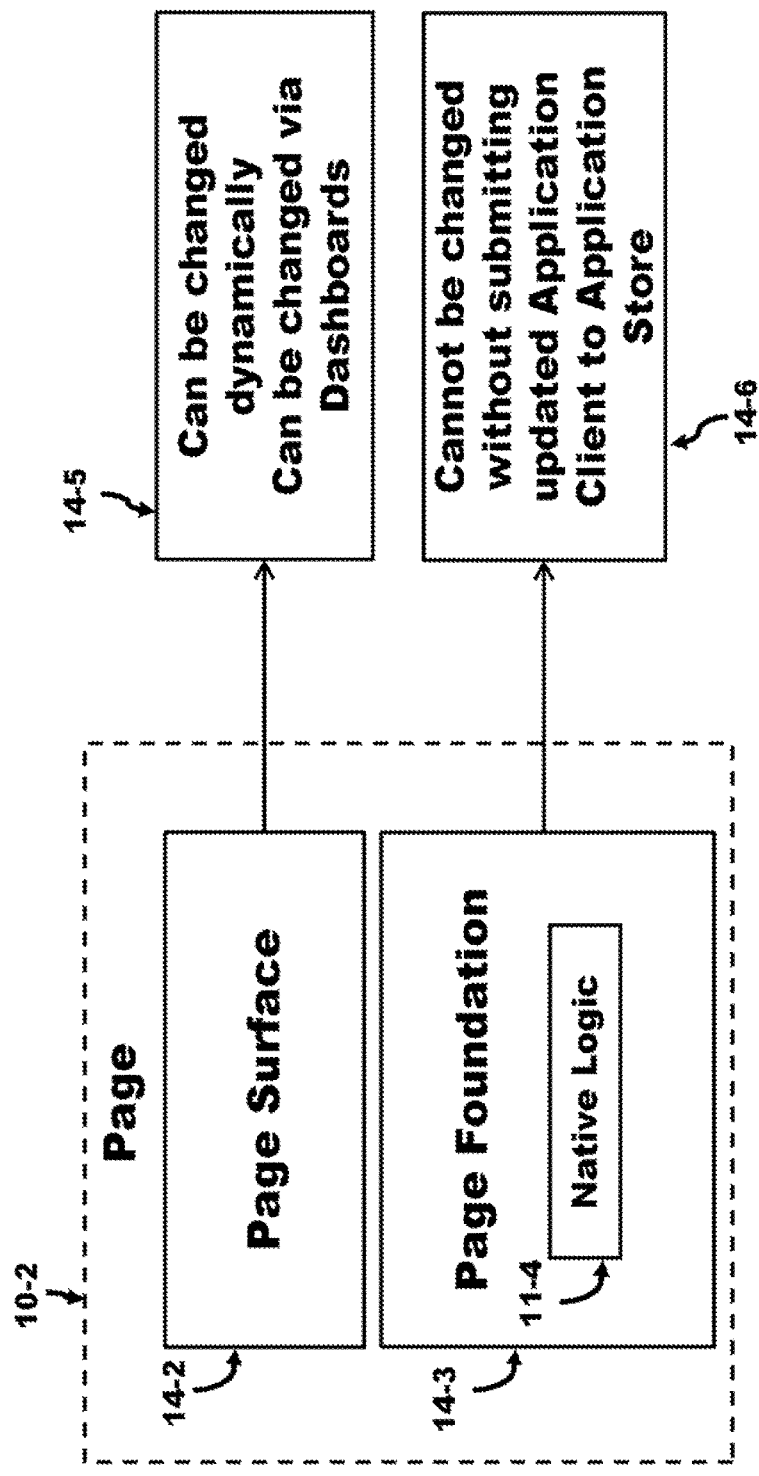
FIG. 14 illustrates the notion of a Page Surface and a Page Foundation in accordance with the present invention.

FIG. 14 depicts a Page 10-2 in the Two-Layer Native Application Client 6-1 which consists of a Page Surface 14-2 and a Page Foundation 14-3. The Page Surface can be changed dynamically and can be changed via Dashboards 14-5. The Page Foundation cannot be changed without submitting the updated Application Client to Application Store 14-6. The Page Surface 14-2 is part of the Dynamic Layer 6-3. The Page Foundation 14-3 is part of the Native Layer 6-2 and includes the Native Logic 11-4. The Dynamic Layer 6-3 of the Two-Layer Native Application Client 6-1 consists of the Page Surfaces 14-2 of all the Pages 10-2 comprised in the Two-Layer Native Application Client 6-1. The Native Layer 6-2 of the Two-Layer Native Application Client 6-1 consists of the Page Foundations 14-3 of all the Pages 10-2 comprised in the Two-Layer Native Application Client 6-1.

Figure 15:
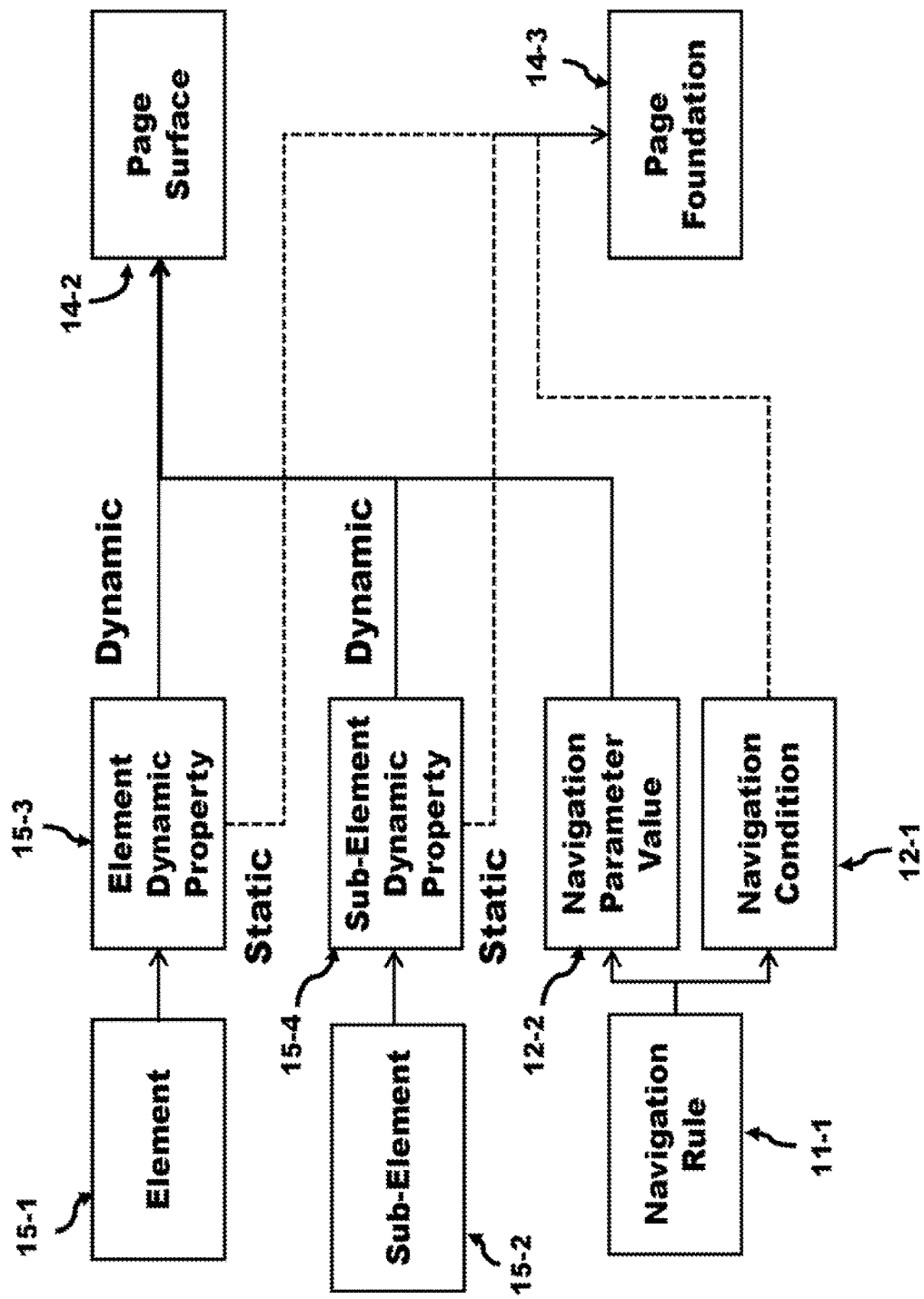
FIG. 15 depicts the assignment of Elements and Sub-Elements to either a Page Surface or a Page Foundation in accordance with the present invention.

FIG. 15 shows how an Element 15-1, a Sub-Element 15-2 and a Navigation Rule 11-1 are made part of either a Page Surface 14-2 or a Page Foundation 14-3 if the Page that contains that Element, Sub-Element, or Navigation Rule. The Element 15-1 is associated with an Element Dynamic Property 15-3. The Element Dynamic Property 15-3 has one of two values, Static and Dynamic. If the value of the Element Dynamic Property 15-3 is Static, the associated element 15-1 is made part of the Page Foundation 14-3. If the value of the Element Dynamic Property 15-3 is Dynamic, the associated element 15-1 is made part of the Page Surface 14-2. The Sub-Element 15-2 is associated with a Sub-Element Dynamic Property 15-4. The Sub-Element Dynamic Property 15-4 has one of two values, Static and Dynamic. If the value of the Sub-Element Dynamic Property 15-4 is Static, the associated Sub-Element 15-2 is made part of the Page Foundation 14-3. If the value of the Sub-Element Dynamic Property 15-4 is Dynamic, the associated Sub-Element 15-2 is made part of the Page Surface 14-2. The Navigation Parameter Value 12-2 of Navigation Rule 11-1 is made part of the Page Surface 14-2 and the Navigation Condition 12-1 is made part of the Page Foundation 14-3.

Figure 16:
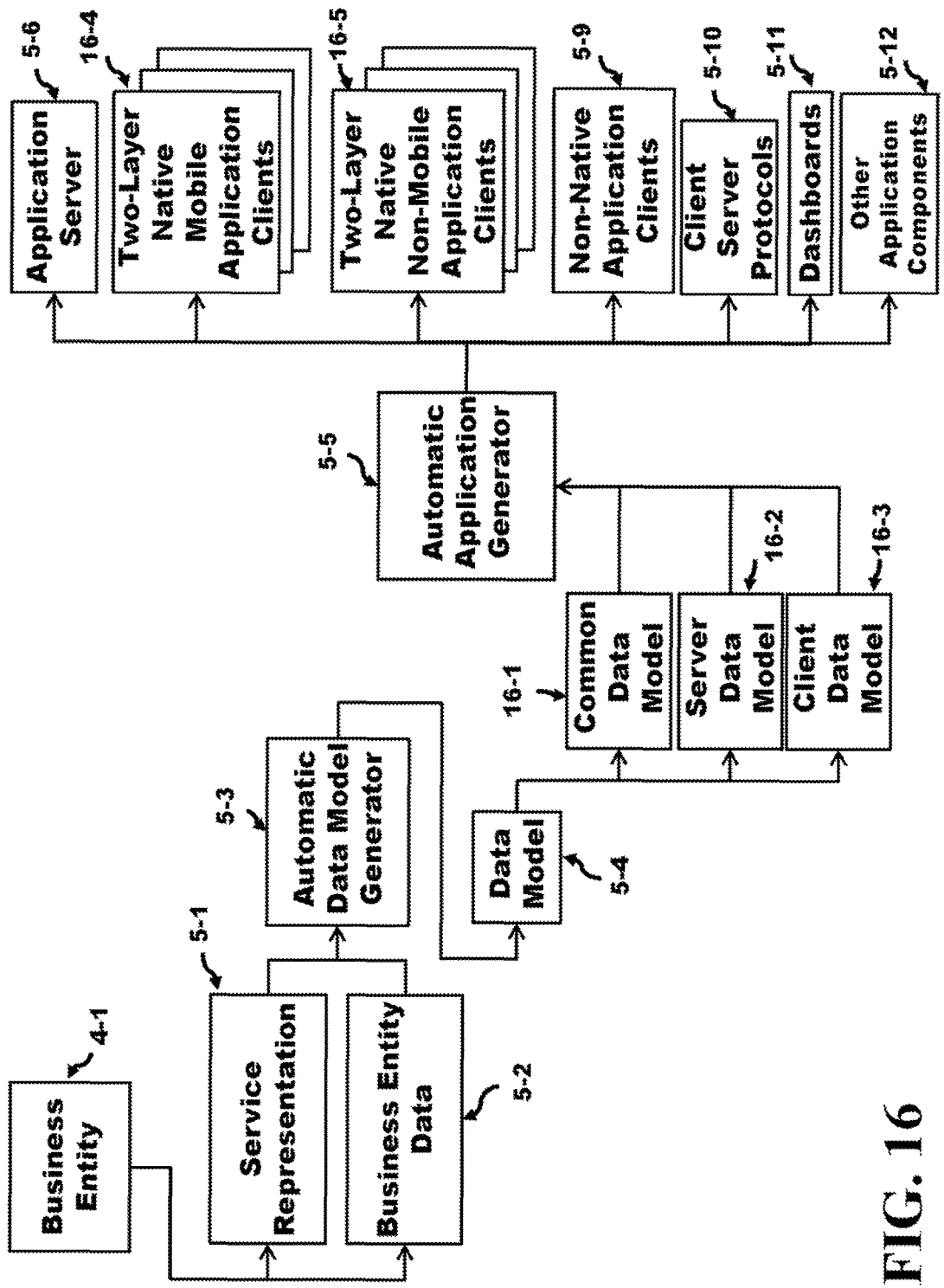
FIG. 16 illustrates a Two-Layer Automatic Application Client Generator in accordance with the present invention.

FIG. 16 depicts a method and apparatus to automatically generate an Application consisting of several Application Components including a set of Two-Layer Native Mobile Application Clients 16-4 and a set of Two-Layer Native Non-Mobile Application Clients 16-5. The method and apparatus described in FIG. 16 has similarities with the method and apparatus depicted in FIG. 5, which is explained in detail in the co-filed U.S. patent application Ser. No. 13/833,589 titled "Apparatus for Single Workflow for Multi-Platform Mobile Application Creation and Delivery" and in U.S. patent application Ser. No. 13/833,669 titled "Method for Single Workflow for Multi-Platform Mobile Application Creation and Delivery" filed on Mar. 15, 2013, which are incorporated in reference in their entirety. However, the method and apparatus described in FIG. 5 generates a set of Native Mobile Application Clients 5-7 and a set of Native Non-Mobile Application Clients 5-8. The method and apparatus described in FIG. 16 generates a set of Two-Layer Native Mobile Application Clients 16-4 and a set of Two-Layer Native Non-Mobile Application Clients 16-5.

A Business Entity 4-1 defines a Service Representation 5-1 and Business Entity Data 5-2. An Automatic Data Model Generator 5-3 takes the Service Representation 5-1 and the Business Entity Data 5-2 as inputs and automatically generates a Data Model 5-4, and from the Data Model 5-4 it generates a Common Data Model 16-1, a Server Data Model 16-2 and a Client Data Model 16-3. Using the generated Common Data Model 16-1, Server Data Model 16-2, and Client Data Model 16-3, an Automatic Application Generator 5-5 automatically generates all the Application Components. The generated Application Components include an Application Server 5-6, a set of Two-Layer Native Mobile Application Clients 16-4, a set of Two-Layer Native Non-Mobile Application Clients 16-5, a set of Non-Native Application Clients 5-9, Client Server Protocols 5-10, Dashboards 5-1, and Other Application Components 5-12. The set of Two-Layer Native Mobile Application Clients 16-4 comprises a Two-Layer Native Application Client executable for each mobile Client Device that the Native Mobile Application Client is desired to run on. The set of Two-Layer Native Non-Mobile Application Clients 16-5 comprises a Two-Layer Native Non-Mobile Application Client executable for each non-mobile Client Device that the Native Non-Mobile Application Client is desired to run on. The generated Dashboards 5-11 can be used to modify the Dynamic Layer of the generated Two-Layer Native Mobile Application Clients 16-4 and Two-Layer Native Non-Mobile Application Clients 16-5. The generated Dashboards 5-11 can also be used to modify the generated Non-Native Application Clients 5-9. The generated Application Server 5-6 can be used to make the modified Dynamic Layer of the generated Two-Layer Native Mobile Application Clients 16-4 and Two-Layer Non-Native Mobile Application Clients 16-5 available for download to the Client Device 1-2. The generated Client Server Protocols 5-10 can be used to download the modified Dynamic Layers to the Client Device 1-2.

Figure 17:
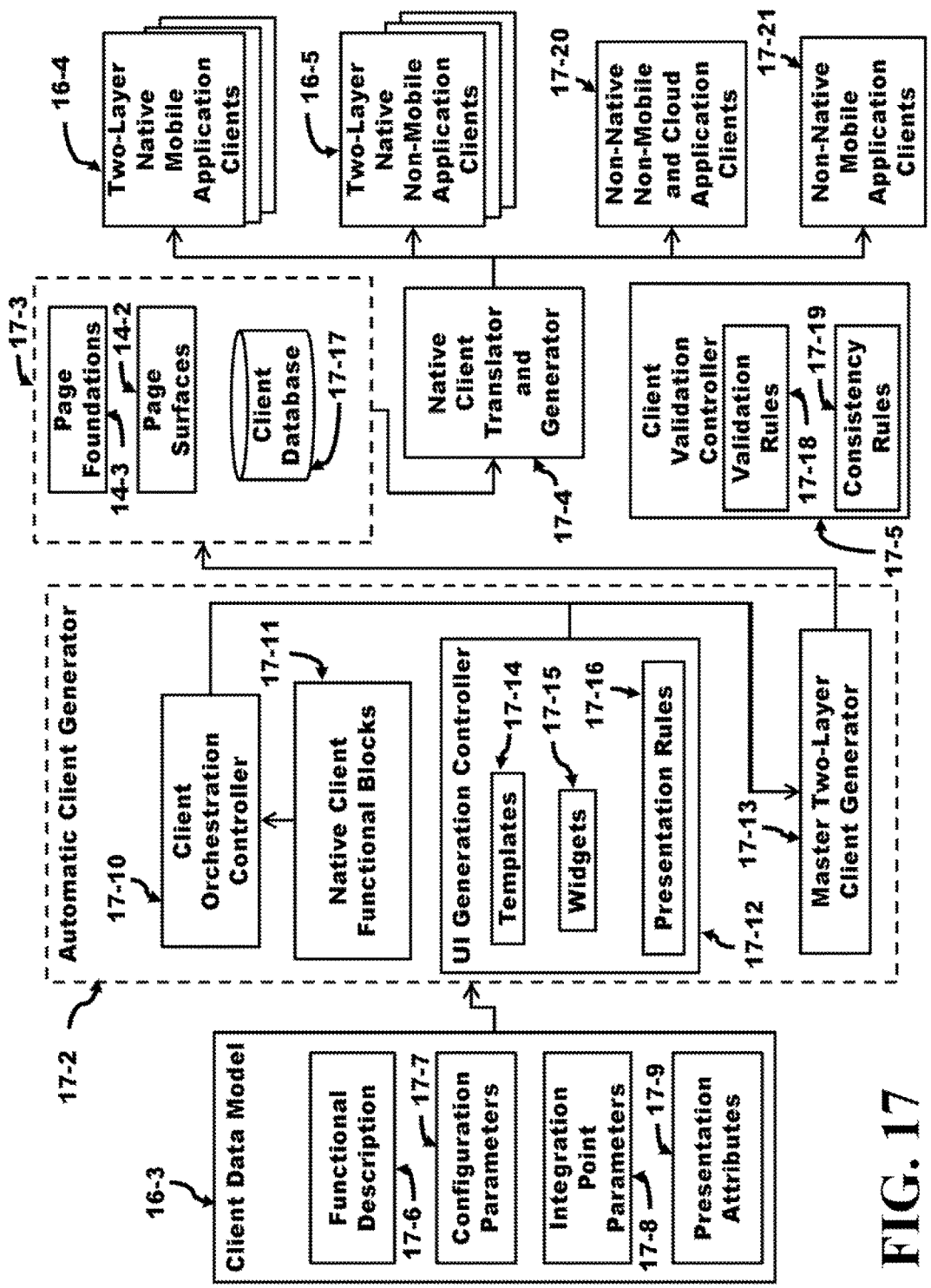
FIG. 17 depicts the details of the Automatic Client Generator in accordance with the present invention.

FIG. 17 illustrates the internal components of the Automatic Client Generator 17-2, which is part of the Automatic Application Generator 5-5. The Automatic Client Generator 17-2 uses the Client Data Model 16-3 to generate the Master Two-Layer Native Application Client 17-3 which is used by the Native Client Translation and Generator 17-4. The Native Client Translator and Generator 17-4 creates the set of Two-Layer Native Mobile Application Clients 16-4, the set of Two-Layer Native Non-Mobile Application Clients 16-5, the set of Non-Native Non-Mobile and Cloud Application Clients 17-20 and the Non-Native Mobile Application Clients 17-21. In the process of doing this, there is a Client Validation Controller 17-5 that contains Validation Rules 17-18 and Consistency Rules 17-19 to ensure that the client components are generated appropriately. Inside the Automatic Client Generator 17-2 is the Native Client Functional Blocks 17-11 that feeds to a Client Orchestration Controller 17-10 which, together with the UI Generator Controller 17-12, feeds the Master Two-Layer Client Generator 17-13. Inside of the UI Generator Controller 20-17 are the Templates 17-14, the Widgets 17-15, and the Presentation Rules 17-16. The Master Application Client 17-3 contains the Page Foundation 14-3, the Page Surfaces 14-2 for all Pages in the Application Client and the Client Database 17-17. Inside the Client Data Model 16-3 are the Functional Description 17-6, the Configuration Parameters 17-7, the Integration Point Parameters 17-8 and the Presentation Attributes 17-9.

Figure 18:
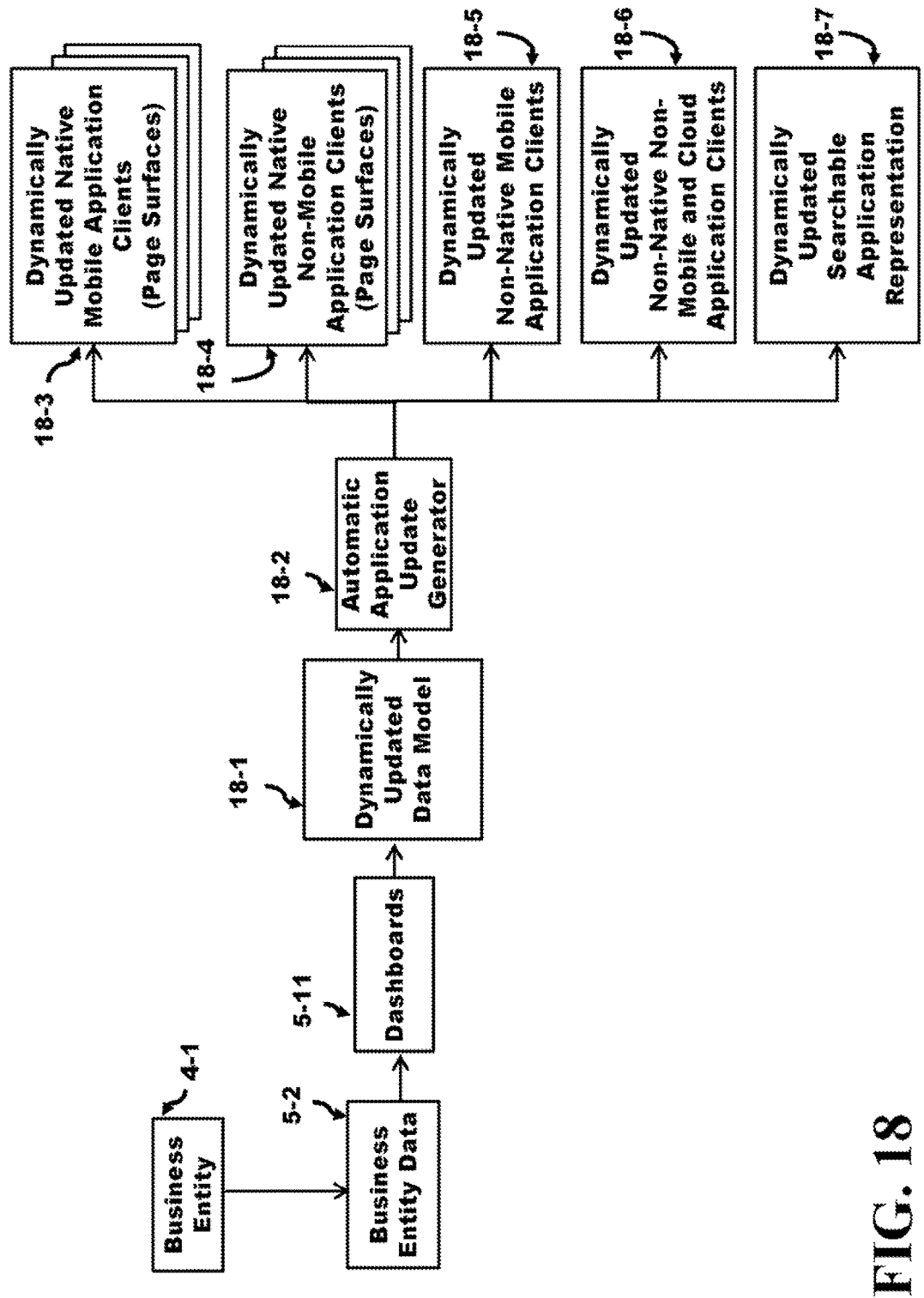
FIG. 18 shows Dashboards used to Update the Dynamic Layer in accordance with the present invention.

FIG. 18 presents a Dynamic Layer Update flow which shows how the newly created Two-Layer Native Application Clients can be modified by the Business Entity 4-1 using the newly created Dashboards 5-11. The Dashboards 5-11 that are automatically created in FIG. 17 are used by the Business Entity 4-1 to add, delete, or modify content, features, and services contained in the Dynamic Layer of the Two-Layer Native Application Clients and replace the existing set of Dynamic Layers in the Client Devices 1-2. The System Solution allows the Business Entity 4-1 to modify the Data Model 5-4 and generate new Dynamic Layers. The generated Dashboards 5-11 allow the Business Entity 4-1 to have control of what the Business Entity wants to present to their Customers. The Business Entity 4-1 using the Dashboards 5-11 generates the Dynamically Updated Data Model 18-1 which is then applied to the Automatic Application Update Generator 18-2 which is a sub-set of the Automatic Application Generator 5-5. The output of the Automatic Application Update Generator 18-2 generates a set of Dynamically Updated Native Mobile Application Clients 18-3, a set of Dynamically Updated Native Non-Mobile Application Clients 18-4. Dynamically Updated Non-Native Mobile Application Client 18-5, Dynamically Updated Non-Native Non-Mobile and Cloud Application Clients 18-6 and an Updated Searchable Application Representation 18-7. The set of Dynamically Updated Native Mobile Application Clients 18-3 and the set of Dynamically Updated Native Non-Mobile Application Clients 18-4 are the updated Dynamic Layers of the corresponding Two-Layer Native Application Clients 6-1. Once this sequence has been established, the Business Entity can manipulate the Business Entity Data 5-2 applied to the Dashboards 5-11 and can continuously and automatically update the various Application Clients that this particular system generates.

Figure 19:
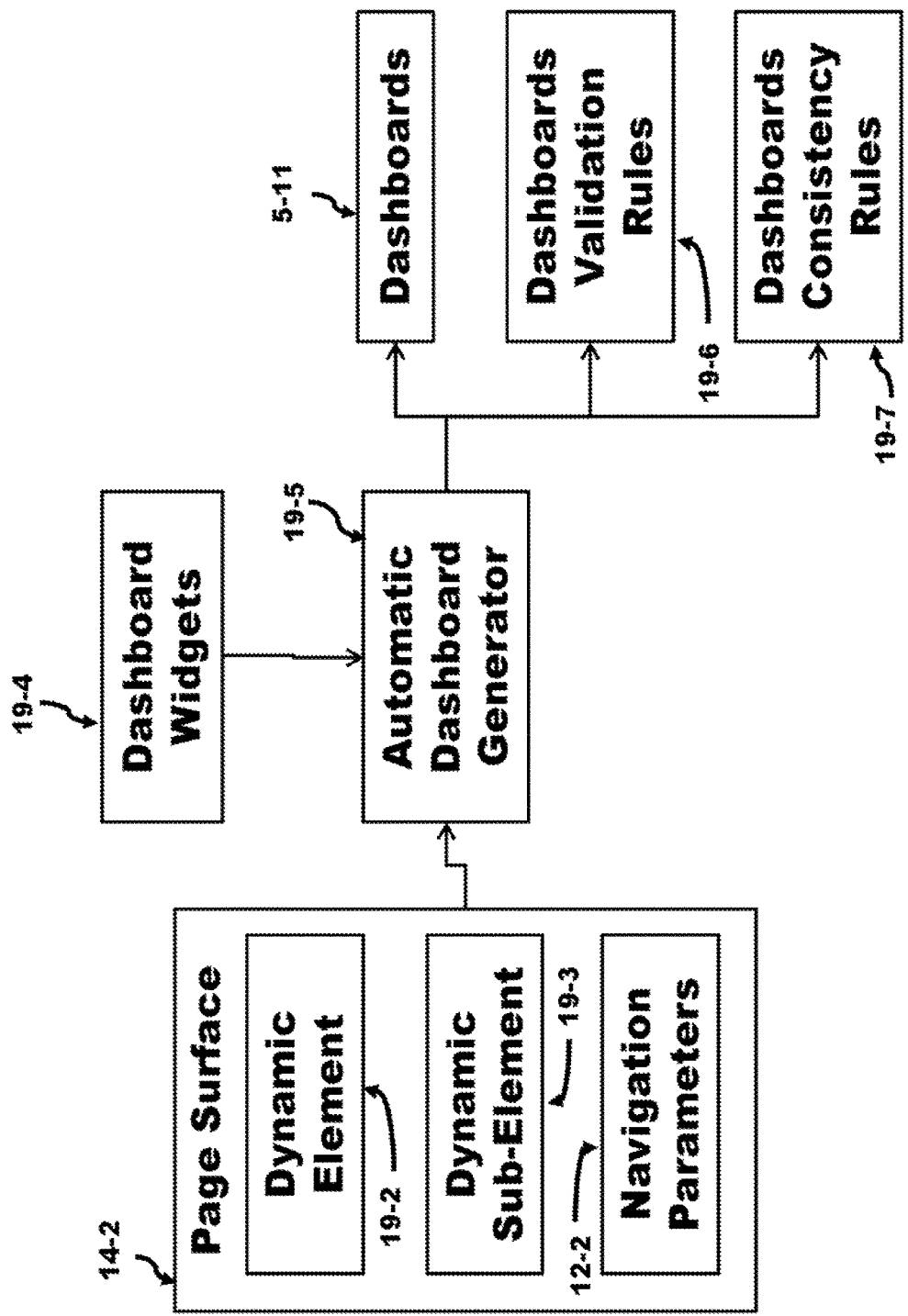
FIG. 19 depicts Surfaces automatically generating Dashboards in accordance with the present invention.

FIG. 19 shows the Automatic Dashboard Generator 19-5, which is part of the Automatic Application Generator 5-5. The Automatic Dashboard Generator 19-5 derives the Dashboards 5-11 from the Page Surface 14-2 of all the Pages comprised in the Application Client, using the Dashboard Widgets 19-4. The Page Surface contains the Dynamic Element 19-2, which are the Elements 15-1 in the Page with Element Dynamic Property 15-3 of value equal to Dynamic, the Dynamic Sub-Element 19-3, which are the Sub-Elements 15-2 in the Page with Sub-Element Dynamic Property 15-4 of value equal to Dynamic, and the Navigation Parameter Values 12-2. The Automatic Dashboard Generator 19-5 also generates the Dashboards Validation Rules 19-6 and Dashboards Consistency Rules 19-7 to ensure that the Dashboards 5-11 are generated correctly.

The Automatic Application Generator 5-5 also comprises an Automatic Application Server Generator, an Automatic Protocol Generator, an Automatic Searchable Application Representation Generator, an Automatic Business Portal Generator, and an Automatic Business Account Generator which are not described here because they are similar to the corresponding blocks explained in detail in the co-filed U.S. patent application Ser. No. 13/833,589 titled "Apparatus for Single Workflow for Multi-Platform Mobile Application Creation and Delivery" and in U.S. patent application Ser. No. 13/833,669 titled "Method for Single Workflow for Multi-Platform Mobile Application Creation and Delivery" filed on Mar. 15, 2013, which are incorporated in reference in their entirety.

Figure 20:
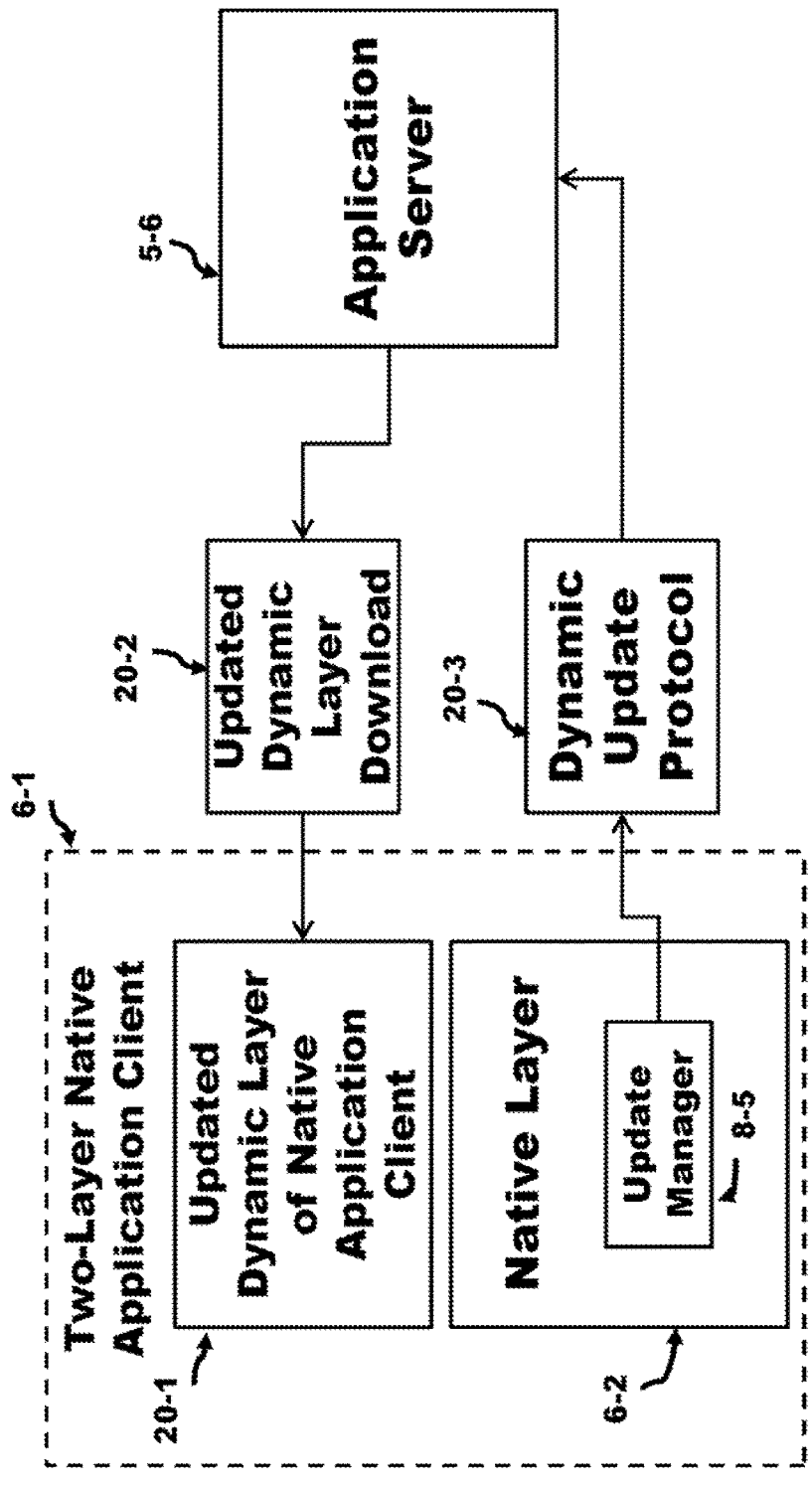
FIG. 20 shows an Update Manger continuously checking for Updates on an Application Server in accordance with the present invention.

FIG. 20 shows an update process with which the Update Manager 8-5 contained in the Native Layer 6-2 of the Two-Layer Native Application Client 6-1 queries the Application Server 5-6 while the Two-Layer Native Application Client 6-1 is running on the Client Device 1-2 to check if a newer version of the Dynamic Layer that is currently running on the Client Device 1-2 is available in the Application Server 5-6. For this purpose, the Update Manager 8-5 uses a Dynamic Update Protocol 20-3, which is part of the generated Client Server Protocols 5-10. When a newer version of the Dynamic Layer becomes available in the Application Server 5-6, it is downloaded to the Client Device using the Updated Dynamic Layer Download 20-2, and the Updated Dynamic Layer 20-1 is run on the Client Device 1-2.

Figure 21:
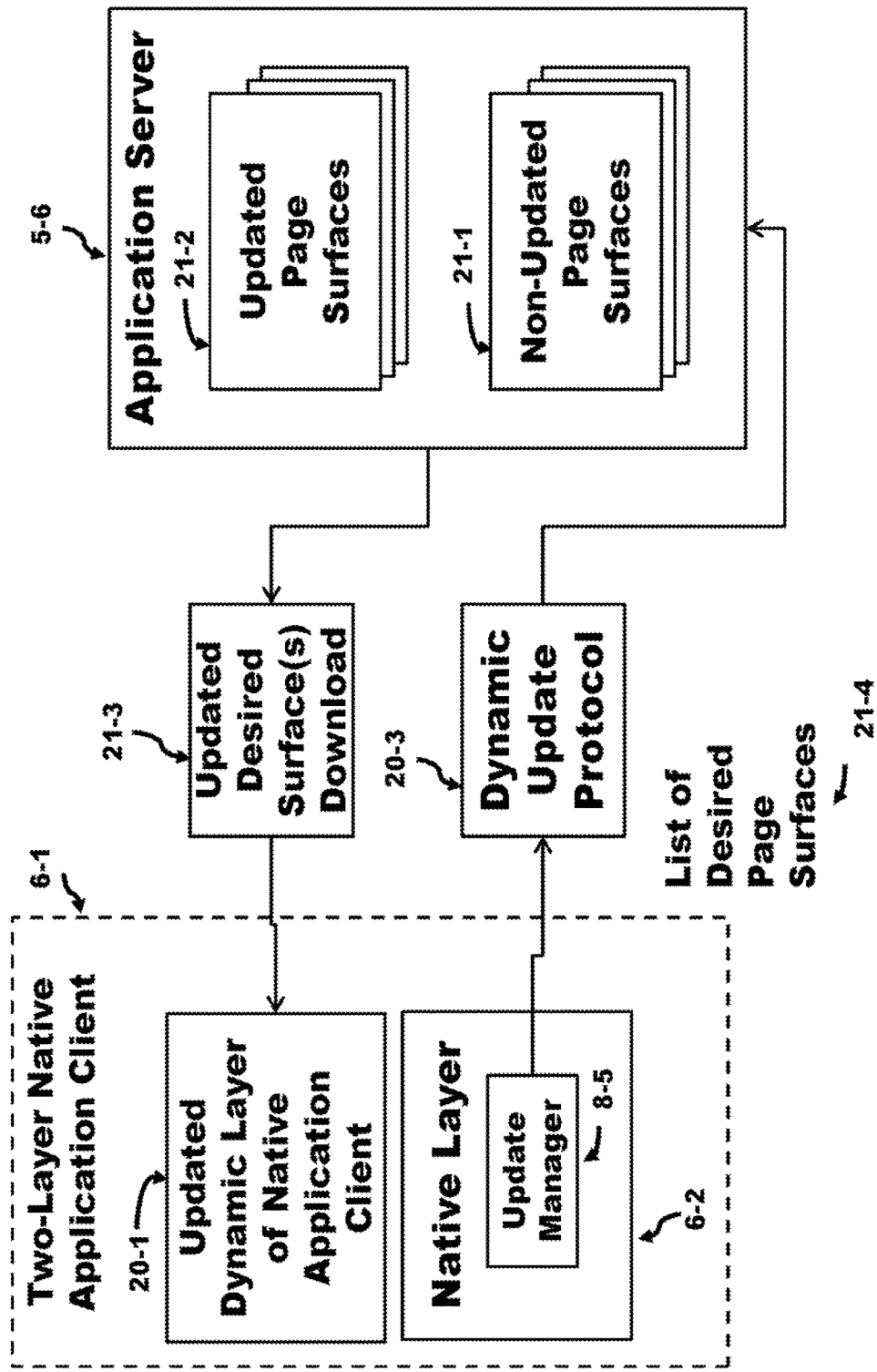
FIG. 21 illustrates updating Surfaces that have changed in accordance with the present invention.

FIG. 21 shows an optimized alternative to the process described in FIG. 20. In this alternative process, when the Update Manager 8-5 contained in the Native Layer 6-2 of the Two-Layer Native Application Client 6-1 queries the Application Server 5-6 using the Dynamic Update Protocol 20-3 to check whether a newer version of the Dynamic Layer that is currently running on the Client Device 1-2 is available in the Application Server 5-6, it also provides a List of the Desired Page Surfaces 21-4 that are needed to be displayed to the end user. When a newer version of the Dynamic Layer becomes available in the Application Server 5-6, only the Page Surfaces included in the List of Desired Page Surfaces 21-4 are downloaded using the Updated Desired Surface(s) Download 21-3, and the Updated Dynamic Layer 20-1 is run on the Client Device 1-2. Using this optimized alternative, the bandwidth usage and communication between the Client Device 1-2 and the Application Server 5-6 is optimized, and the memory storage of the Client Device 1-2 is optimized, since the entire Dynamic Layer does not need to be downloaded to the Two-Layer Native Application Client 6-1. Only the Page Surfaces that have changed and that are desired by the end user need to be downloaded to the Two-Layer Native Application Client 6-1. An even more optimized second alternative to this process downloads only the Elements, Sub-Elements, and Navigation Parameters that have been updated in the Desired Page Surfaces. The second alternative is an optimal update process of the Two-Layer Native Application Client 6-1.

Finally, it is understood that the above descriptions are only illustrative of the principle of the current invention. Various alterations, improvements, and modifications will occur and are intended to be suggested hereby, and are within the spirit and scope of the invention. This invention can, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. In accordance with these principles, those skilled in the art can devise numerous modifications without departing from the spirit and scope of the invention. For example, In addition, a network and a portable system can exchange information wirelessly by using communication techniques such as Time Division Multiple Access (TDMA), Frequency Division Multiple Access (FDMA), Code Division Multiple Access (CDMA), Orthogonal Frequency Division Multiplexing (OFDM), Ultra Wide Band (UWB), Wi-Fi, WiGig, Bluetooth, etc. The network can comprise the phone network, IP (Internet protocol) network, Local Area Network (LAN), ad hoc networks, local routers and even other portable systems. In addition, the term "Mobile Client Device" can be used for mobile devices such as cellphone, tablets, etc. "Non-Mobile Client Device" can be used for non-mobile devices such as desktops. "Cloud Client Device" can be used for the device formed in the Cloud. At other instants the term "Client Device" can imply either the "Mobile Client Device," "Non-Mobile Client Device" or "Cloud Client Device."

What is claimed is:

1. A system comprising:
an application generator configured to be connected to a network and to automatically generate a two-layer native application client of which at least a portion of the two-layer application client is configured to run on a client device, an application server software and a dashboard that is generated by a dashboard generator, wherein the application generator generates an input to the dashboard generator that generates the dashboard;
an application server configured to be connected to the network;
the application generator configured to be coupled, via the network, to the application server to automatically deploy the application server software to the application server;
the two-layer native application client includes a native layer and a dynamic layer;
the native layer interacting directly with system libraries of an operating system of the client device;
the dynamic layer interacting indirectly with the system libraries of the operating system of the client device via the native layer; and
the application server being dynamically adapted by the application server software to receive a user input via the dashboard and to deploy an updated dynamic layer to the client device to update the two-layer native application client, the updated dynamic layer being automatically generated based on the received user input,
wherein the application server software is configured to directly update the dynamic layer of the two-layer native application client while executing the native layer of the two-layer native application client.

2. The system of claim 1,
wherein the native layer comprises an update manager to download the updated dynamic layer to the client device from the application server.

3. The system of claim 2,
wherein the two-layer native application client is updated with the updated dynamic layer while the two-layer native application client is running on the client device.

4. The system of claim 1,
wherein the two-layer native application client comprises a plurality of pages each with at least one button where said buttons are navigation elements.

5. The system of claim 4,
wherein each of the plurality of pages comprises a plurality of elements each with a plurality of sub-elements, a navigation element, an actionable element, a navigation rule, a fillable element, and a native logic with an orchestration, an update manager and native client functional blocks.

6. The system of claim 5,
wherein each page of the plurality of pages has a page state of "in use" or "standby".

7. The system of claim 5,
wherein a conditional navigation determines when a navigation element is displayed in a first page and one or more pages of a second plurality of pages that are linked to the first page.

8. A system comprising:
a processor;
a memory coupled to the processor, the memory having stored therein software instructions that, when executed by the processor, cause the processor to perform operations including:
automatically generating, by an application generator, a set of application components, the set of application components comprising a two-layer application client, an application server software based on entity-specific data, and a dashboard that is generated by a dashboard generator, wherein the application generator generates an input to the dashboard generator, wherein the two-layer application client is runnable on a client device and includes a dynamic layer and a native layer, the dynamic and native layers being separately updateable; and automatically deploying the application server software to a server, the server being adapted by the deployed application server software to make the dashboard available to receive user input, wherein, when a user input is received via the dashboard, a dynamically updated data model is automatically generated based on the received user input and the entity-specific data, and an updated dynamic layer of the two-layer application client is automatically generated based on the dynamically updated data model, the updated dynamic layer being transferred directly to the client device to update the dynamic layer of the two-layer application client, wherein the application server software is configured to directly update the dynamic layer of the two-layer application client while executing the native layer of the two-layer application client.

9. The system of claim 8,
wherein the two-layer application client is a desktop application client or a cloud application client.

10. The system of claim 8,
wherein the two-layer application client comprises a plurality of pages and each page comprises a page surface and a page foundation, the page surface being dynamically updateable via the dashboard.

11. The system of claim 10,
wherein each page surface comprises components including a least one dynamic element, at least one dynamic sub-element, and one or more navigation parameters; and
wherein the operations further include automatically generating dashboards, dashboard validation rules, and dashboards consistency rules based on each page surface.

12. The system of claim 11, the operations further comprising:
generating, based on the dashboard validation rules and the dashboards consistency rules, a plurality of validation controllers to show a validity and a consistency of the dynamically updated data model; and
determining, using the plurality of validation controllers, the validity and consistency of the updated dynamic layer of the two-layer application client.

13. A method of checking for updates on an application server, the method comprising:
automatically generating, by an application generator, a set of application components, the set of application components comprising a two-layer application client of which at least a portion of the two-layer application client is configured to run on a client device, an application server software based on entity-specific data, and a dashboard that is generated by a dashboard generator, wherein the application generator generates an input to the dashboard generator, wherein the two-layer application client comprises a dynamic layer and a native layer, the dynamic layer including a plurality of page surfaces and the native layer including an update manager, wherein the application server software is automatically deployed to the application server, and wherein the application server is configured to communicate with the update manager of the two-layer application client according to a dynamic update protocol;

checking, according to the dynamic update protocol, the application server for an updated page surface and/or a new page surface; and downloading only the updated page surface and/or the new page surface automatically to update the dynamic layer of the two-layer application client, the application server being configured by the automatically deployed application server software to receive user input via the dashboard and to deploy the updated page surface and/or the new page surface to the client device to update the two-layer application client according to the dynamic update protocol, the updated page surface and/or the new page surface being automatically generated based on the received user input, wherein the application server software is configured to directly update the dynamic layer of the two-layer application client while executing the native layer of the two-layer application client.

14. The method of claim 13,
wherein the two-layer application client is a desktop application client.

15. The method of claim 13, further comprising:
providing a plurality of elements with an element dynamic property in a page surface of the plurality of page surfaces;
providing a plurality of sub-elements with a sub-element dynamic property in the page surface; and
when only a subset of the elements in the page surface have been updated, the downloading comprising minimizing bandwidth usage of a network by downloading less than all of the elements of the page surface from the application server.

16. The method of claim 13,
wherein the client device is configured to run only approved applications, the two-layer application client being approved and downloaded from an application store associated with the client device, and
wherein the updated page surface and/or the new page surface are transferred from the application server to the client device to avoid the application store and directly update the two-layer application client.

17. The method of claim 13, further comprising:
applying the updated page surface and/or the new page surface without stopping, deleting, and re-installing the two-layer application client; and
the applying being performed while the two-layer application client is running.

* * * * *